United States Patent
Soltani et al.

(10) Patent No.: US 11,729,655 B2
(45) Date of Patent: Aug. 15, 2023

(54) PHASE NOISE PROFILE SIGNALING FOR SINGLE CARRIER WAVEFORM IN HIGHER BANDS

(71) Applicant: QUALCOMM Incorporated, San Diego, CA (US)

(72) Inventors: Morteza Soltani, San Diego, CA (US); Jun Ma, San Diego, CA (US); Iyab Issam Sakhnini, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/344,873

(22) Filed: Jun. 10, 2021

(65) Prior Publication Data

US 2022/0408289 A1    Dec. 22, 2022

(51) Int. Cl.
| | |
|---|---|
| *H04L 27/26* | (2006.01) |
| *H04W 24/10* | (2009.01) |
| *H04B 17/336* | (2015.01) |
| *H04L 5/00* | (2006.01) |
| *H04W 24/08* | (2009.01) |

(52) U.S. Cl.
CPC .......... *H04W 24/10* (2013.01); *H04B 17/336* (2015.01); *H04L 5/0051* (2013.01); *H04W 24/08* (2013.01)

(58) Field of Classification Search
CPC .. H04L 27/2613; H04L 24/144; H04L 5/0048
See application file for complete search history.

(56) References Cited

U.S. PATENT DOCUMENTS

| | | | |
|---|---|---|---|
| 2017/0195142 A1* | 7/2017 | Sanderovich | .......... H04B 7/086 |
| 2018/0041321 A1 | 2/2018 | Guo et al. | |
| 2018/0091350 A1 | 3/2018 | Akkarakaran et al. | |
| 2018/0183532 A1 | 6/2018 | Da Silva | |
| 2020/0021412 A1* | 1/2020 | Xu | .......... H04L 1/0021 |
| 2020/0220755 A1* | 7/2020 | Maki | .......... H04L 5/0023 |
| 2021/0112525 A1* | 4/2021 | Sarkis | .......... H04L 1/0013 |

OTHER PUBLICATIONS

International Search Report and Written Opinion—PCT/US2022/072856—ISA/EPO—dated Sep. 28, 2022.

* cited by examiner

*Primary Examiner* — Zhiren Qin
(74) *Attorney, Agent, or Firm* — Arun Swain; Holland & Hart LLP

(57) ABSTRACT

Methods, systems, and devices for wireless communications are described. A transmitting device may determine a phase noise profile and may transmit the phase noise profile to a receiving device. The receiving device may use the phase noise profile and received phase tracking reference signals to more accurately determine phase errors on a wireless channel between the two devices and compensate for the phase noise errors. In examples where the UE transmits the phase noise profile to the base station, the UE may include the phase noise profile in a measurement report or in a radio resource control (RRC) message, among other examples. In examples where the base station transmits the phase noise profile to a UE, the base station may include the phase noise profile in a broadcast message, a unicast message, or an RRC message.

26 Claims, 16 Drawing Sheets

PHASE NOISE PROFILE SIGNALING FOR SINGLE CARRIER WAVEFORM IN HIGHER BANDS

TECHNICAL FIELD

The following relates to wireless communications, including phase noise profile signaling for a single carrier waveform.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may communicate on relatively high frequency bands. In some such high frequency examples, some wireless communication systems may limit communications according to relatively stringent energy efficiency constraints. To comply with such energy efficiency constraints, single carrier (SC) waveforms may be utilized. In such examples, a transmitting device (e.g., the UE or the base station) may transmit data signaling and one or more phase tracking reference signals (PTRSs), which can be used by a receiving device to compensate for some phase noise at the receiving device. However, both the transmitting device and the receiving device may experience phase noise. Furthermore, communication in high frequency bands, while potentially resulting in high throughput, may involve greater sensitivity to phase noise. In some examples, the receiving device may be particularly sensitive to phase noise. The phase noise at both the transmitting device and the receiving device may affect the reliability of wireless communications, among other disadvantages.

SUMMARY

The systems, methods and devices of this disclosure each have several innovative aspects, no single one of which is solely responsible for the desirable attributes disclosed herein.

A method for wireless communications at a user equipment (UE) is described. The method may include performing, by the UE, one or more phase noise measurements associated with a single carrier, transmitting, to a base station, one or more phase noise statistical values based on the one or more phase noise measurements, and transmitting, to the base station, one or more uplink messages and one or more phase tracking reference signals based on the one or more phase noise statistical values.

An apparatus for wireless communications at a UE is described. The apparatus may include a processor, memory coupled with the processor, and instructions stored in the memory. The instructions may be executable by the processor to cause the apparatus to perform, by the UE, one or more phase noise measurements associated with a single carrier, transmit, to a base station, one or more phase noise statistical values based on the one or more phase noise measurements, and transmit, to the base station, one or more uplink messages and one or more phase tracking reference signals based on the one or more phase noise statistical values.

Another apparatus for wireless communications at a UE is described. The apparatus may include means for performing, by the UE, one or more phase noise measurements associated with a single carrier, means for transmitting, to a base station, one or more phase noise statistical values based on the one or more phase noise measurements, and means for transmitting, to the base station, one or more uplink messages and one or more phase tracking reference signals based on the one or more phase noise statistical values.

A non-transitory computer-readable medium storing code for wireless communications at a UE is described. The code may include instructions executable by a processor to perform, by the UE, one or more phase noise measurements associated with a single carrier, transmit, to a base station, one or more phase noise statistical values based on the one or more phase noise measurements, and transmit, to the base station, one or more uplink messages and one or more phase tracking reference signals based on the one or more phase noise statistical values.

A method for wireless communications at a base station is described. The method may include receiving, from a UE, one or more phase noise statistical values for the UE associated with a single carrier, receiving, from the UE, one or more uplink messages and one or more phase tracking reference signals based on the one or more phase noise statistical values, estimating one or more phase noise values based on the one or more phase tracking reference signals and the one or more phase noise statistical values, and demodulating the one or more uplink messages based on the one or more phase noise values.

An apparatus for wireless communications at a base station is described. The apparatus may include a processor, memory coupled with the processor, and instructions stored in the memory. The instructions may be executable by the processor to cause the apparatus to receive, from a UE, one or more phase noise statistical values for the UE associated with a single carrier, receive, from the UE, one or more uplink messages and one or more phase tracking reference signals based on the one or more phase noise statistical values, estimate one or more phase noise values based on the one or more phase tracking reference signals and the one or more phase noise statistical values, and demodulate the one or more uplink messages based on the one or more phase noise values.

Another apparatus for wireless communications at a base station is described. The apparatus may include means for receiving, from a UE, one or more phase noise statistical values for the UE associated with a single carrier, means for receiving, from the UE, one or more uplink messages and one or more phase tracking reference signals based on the one or more phase noise statistical values, means for estimating one or more phase noise values based on the one or more phase tracking reference signals and the one or more phase noise statistical values, and means for demodulating the one or more uplink messages based on the one or more phase noise values.

A non-transitory computer-readable medium storing code for wireless communications at a base station is described. The code may include instructions executable by a processor to receive, from a UE, one or more phase noise statistical values for the UE associated with a single carrier, receive, from the UE, one or more uplink messages and one or more phase tracking reference signals based on the one or more phase noise statistical values, estimate one or more phase noise values based on the one or more phase tracking reference signals and the one or more phase noise statistical values, and demodulate the one or more uplink messages based on the one or more phase noise values.

A method for wireless communications at a base station is described. The method may include performing, by the base station, one or more phase noise measurements associated with a single carrier, transmitting, to a UE, one or more phase noise statistical values based on the one or more phase noise measurements, and transmitting, to the UE, one or more downlink messages and one or more phase tracking reference signals based on the one or more phase noise statistical values.

An apparatus for wireless communications at a base station is described. The apparatus may include a processor, memory coupled with the processor, and instructions stored in the memory. The instructions may be executable by the processor to cause the apparatus to perform, by the base station, one or more phase noise measurements associated with a single carrier, transmit, to a UE, one or more phase noise statistical values based on the one or more phase noise measurements, and transmit, to the UE, one or more downlink messages and one or more phase tracking reference signals based on the one or more phase noise statistical values.

Another apparatus for wireless communications at a base station is described. The apparatus may include means for performing, by the base station, one or more phase noise measurements associated with a single carrier, means for transmitting, to a UE, one or more phase noise statistical values based on the one or more phase noise measurements, and means for transmitting, to the UE, one or more downlink messages and one or more phase tracking reference signals based on the one or more phase noise statistical values.

A non-transitory computer-readable medium storing code for wireless communications at a base station is described. The code may include instructions executable by a processor to perform, by the base station, one or more phase noise measurements associated with a single carrier, transmit, to a UE, one or more phase noise statistical values based on the one or more phase noise measurements, and transmit, to the UE, one or more downlink messages and one or more phase tracking reference signals based on the one or more phase noise statistical values.

A method for wireless communications at a UE is described. The method may include receiving, from a base station, one or more phase noise statistical values for the base station associated with a single carrier, receiving, from the base station, one or more downlink messages and one or more phase tracking reference signals based on the one or more phase noise statistical values, estimating one or more phase noise values based on the one or more phase tracking reference signals and the one or more phase noise statistical values, and demodulating the one or more downlink messages based on the one or more phase noise values.

An apparatus for wireless communications at a UE is described. The apparatus may include a processor, memory coupled with the processor, and instructions stored in the memory. The instructions may be executable by the processor to cause the apparatus to receive, from a base station, one or more phase noise statistical values for the base station associated with a single carrier, receive, from the base station, one or more downlink messages and one or more phase tracking reference signals based on the one or more phase noise statistical values, estimate one or more phase noise values based on the one or more phase tracking reference signals and the one or more phase noise statistical values, and demodulate the one or more downlink messages based on the one or more phase noise values.

Another apparatus for wireless communications at a UE is described. The apparatus may include means for receiving, from a base station, one or more phase noise statistical values for the base station associated with a single carrier, means for receiving, from the base station, one or more downlink messages and one or more phase tracking reference signals based on the one or more phase noise statistical values, means for estimating one or more phase noise values based on the one or more phase tracking reference signals and the one or more phase noise statistical values, and means for demodulating the one or more downlink messages based on the one or more phase noise values.

A non-transitory computer-readable medium storing code for wireless communications at a UE is described. The code may include instructions executable by a processor to receive, from a base station, one or more phase noise statistical values for the base station associated with a single carrier, receive, from the base station, one or more downlink messages and one or more phase tracking reference signals based on the one or more phase noise statistical values, estimate one or more phase noise values based on the one or more phase tracking reference signals and the one or more phase noise statistical values, and demodulate the one or more downlink messages based on the one or more phase noise values.

DETAILED DESCRIPTION

Figure 1:
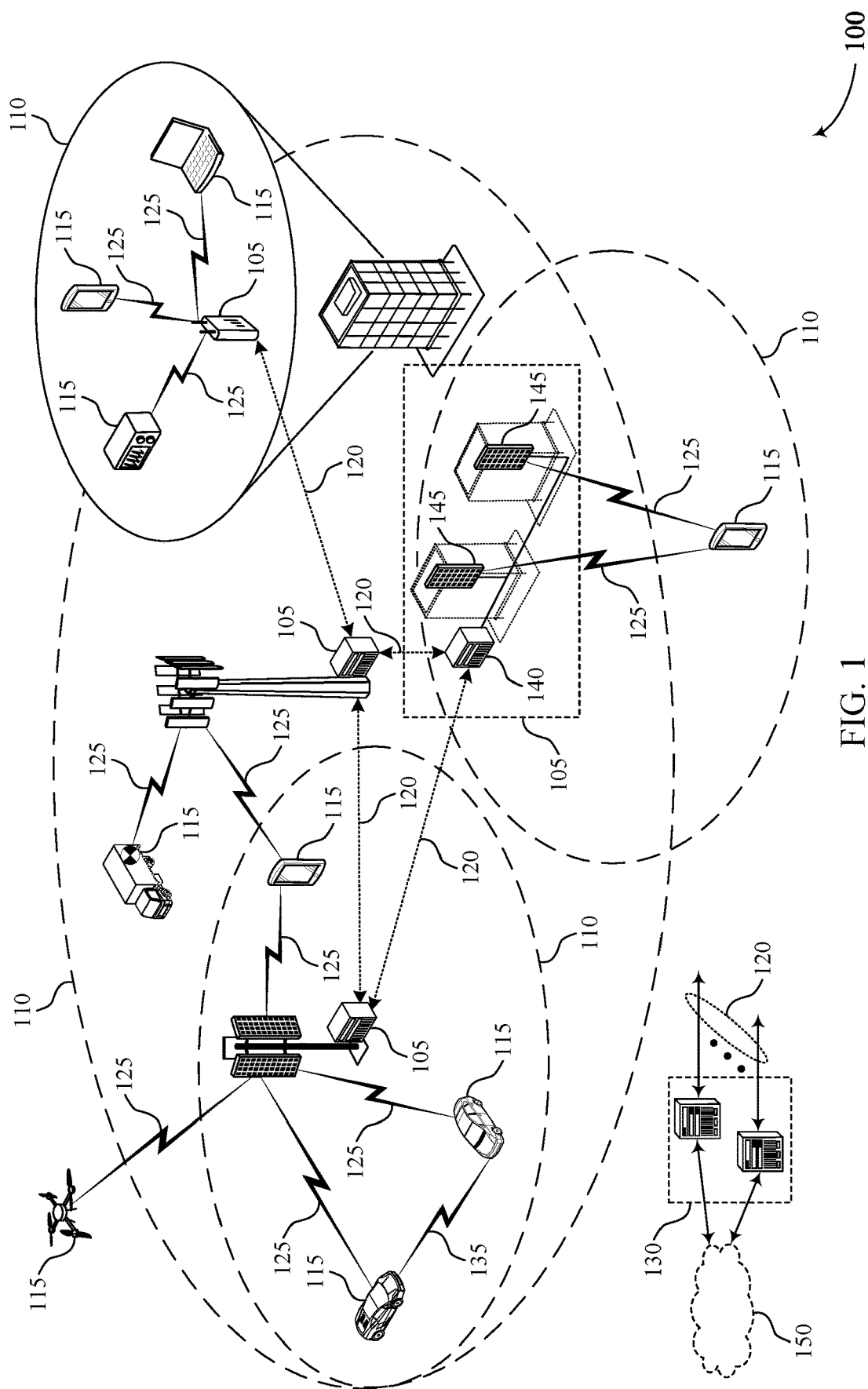
FIG. 1 illustrates an example of a wireless communications system that supports phase noise profile signaling for a single carrier waveform in accordance with aspects of the present disclosure.

Some configurations of single carrier waveforms may result in higher data rates and increased throughput. However, at relatively higher frequencies, wireless communications may be more prone to adverse effects from phase noise (for example, phase errors resulting from local oscillators at both a user equipment (UE) and a base station). A transmitting device (for example, a base station or a UE) may transmit bursts of phase tracking reference signals (PTRSs) from which the receiving device may estimate and compensate for such phase errors (for example, phase errors caused by the local oscillators of the receiving device). However, as described above, especially for relatively high frequency communications, both the transmitting device and the receiving device may affect the phase errors, and as such, receiver-side phase error compensation may be less effective. For example, a receiving device (for example, a base station) may estimate phase noise for a transmitting device (for example, a UE). But such phase noise estimations may be significantly more accurate if the receiving device can incorporate phase noise statistical values into the phase noise estimation (for example, phase variance across different frequencies at both the transmitting and receiving devices). However, existing phase noise estimation techniques may rely on fixed phase noise settings. Without phase noise statistical values for both transmitting and receiving devices, phase noise estimations may be less accurate, resulting in degraded quality and reliability of wireless communications, delayed or failed transmissions, and increased system latency, among other examples.

Various aspects generally relate to wireless communication, and more specifically to phase noise profile signaling for SC waveforms. In some examples, a transmitting device (for example, a base station or a UE) may determine a phase noise profile (for example, a phase noise spectrum mask including a set of phase noise statistical values) based on performed phase noise measurements, and may transmit the phase noise profile to a receiving device. The receiving device may use the phase noise profile and PTRSs received from the transmitting device to determine phase errors on a wireless channel between the two devices and to compensate for the phase noise errors. In examples in which the UE transmits the phase noise profile to the base station, the UE may include the phase noise profile in a measurement report (for example, via a data structure in the measurement report). Additionally or alternatively, in some examples, the UE may transmit the phase noise profile in a radio resource control (RRC) message. In examples in which the base station transmits the phase noise profile to a UE, the base station may include the phase noise profile in a broadcast or unicast message, or may transmit the phase noise profile in an RRC message, for example, in response to a request from the UE. In some examples, the transmitting device may detect a triggering condition (for example, a change in temperature, transmit power, operating band, or voltage, among other examples), and may determine and transmit an update of the phase noise profile to the receiving device. The update may include a full set of updated phase noise statistical values (for example, transmitted on a single frequency), or individual updated statistical values (for example, transmitted on respective frequencies to which the updates correspond).

Particular aspects of the subject matter described in this disclosure may be implemented to realize one or more of the following potential advantages. Techniques described herein may allow a receiving device to more accurately detect and compensate for phase errors, which may result in improved quality and reliability of communications. Increased accuracy in detection and compensation of phase errors may also support high throughput communications on relatively high frequency bands, resulting in decreased system latency and improved data rates, while addressing potential corresponding increases in phase noise and phase errors, among other advantages.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to phase noise profile signaling for a single carrier waveform.

FIG. 1 illustrates an example of a wireless communications system 100 that supports phase noise profile signaling for a single carrier waveform in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix (CP). A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the CP prepended to each symbol period). In some wireless communications systems 100, a slot may further be divided into multiple mini-slots containing one or more symbols. Excluding the CP, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a transmitting device (for example, a base station 105 or a UE 115) may determine a phase noise profile (for example, a phase noise spectrum mask), and may transmit the phase noise profile to a receiving device. The receiving device may use the phase noise profile and received PTRSs to more accurately determine phase errors on a wireless channel between the two devices, and compensate for the phase noise errors. In examples in which the UE 115 transmits the phase noise profile to the base station 105, the UE 115 may include the phase noise profile in a measurement report (for example, via a new data structure in the measurement report). Or, the UE 115 may transmit the noise profile in a new radio resource control (RRC) message for the purpose of phase noise profile transmission. In examples in which the base station transmits the phase noise profile to a UE 115, the base station may include the phase noise profile in a broadcast or unicast message or may transmit the phase noise profile in an RRC message in response to a request from the UE 115. In some examples, the transmitting device may detect a triggering condition (for example, a change in temperature, transmit power, operating band, or voltage, among other examples), and may transmit an update of the phase noise profile. The update may include a full set of updated phase noise statistical values (for example, transmitted on a single frequency), or individual updated statistical values (for example, transmitted on respective frequencies to which the updates correspond).

Figure 2:
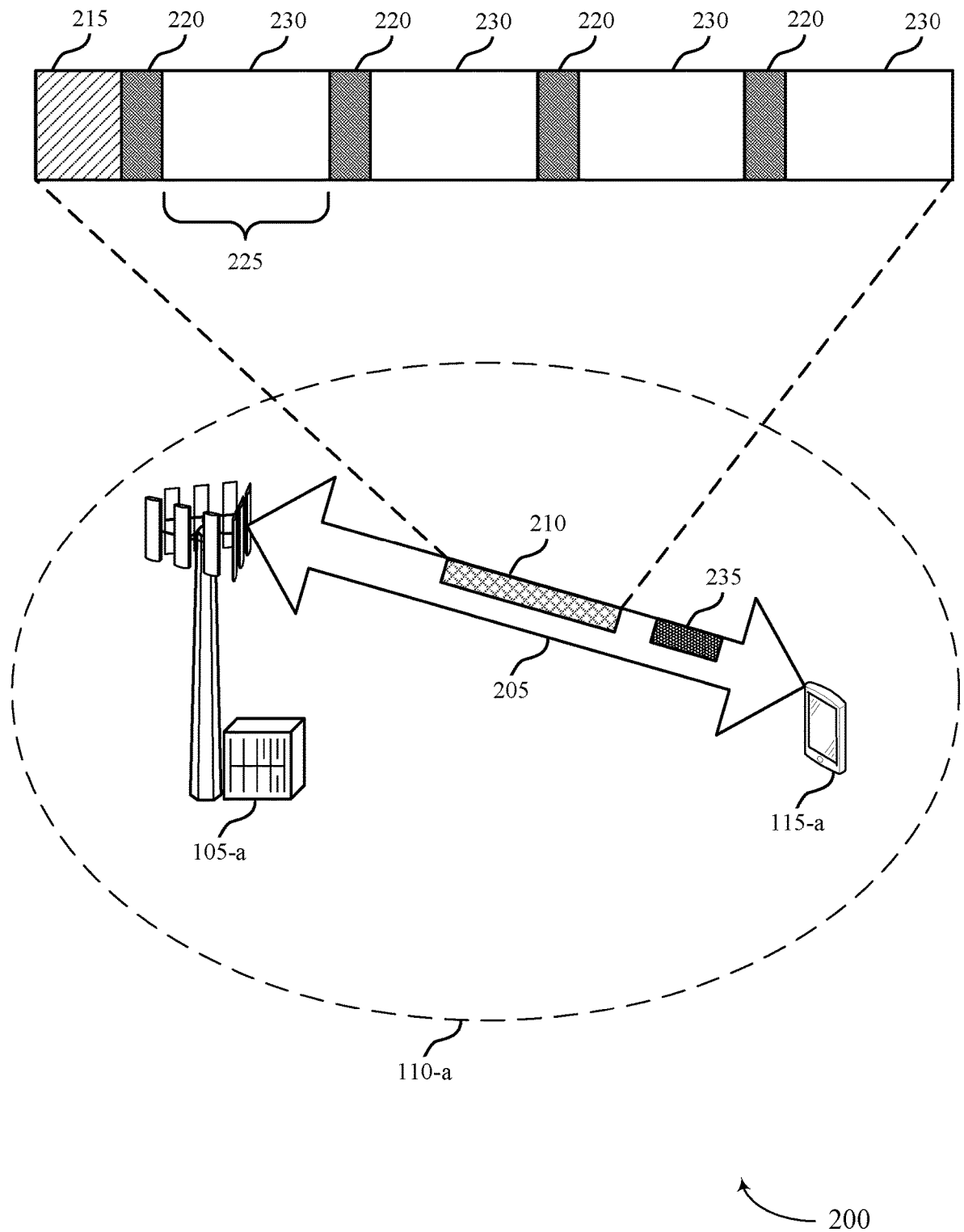
FIG. 2 illustrates an example of a wireless communications system that supports phase noise profile signaling for a single carrier waveform in accordance with aspects of the present disclosure.

FIG. 2 illustrates an example of a wireless communications system 200 that supports phase noise profile signaling for a single carrier waveform in accordance with aspects of the present disclosure. The wireless communications system 200 may include a base station 105-a and a UE 115-a, which may be examples of corresponding devices described with reference to FIG. 1.

In some examples, wireless devices (for example, the base station 105-a and UE 15-a) may support communications on relatively high frequency bands (for example, frequency range 4 (FR4). Some communications scenarios (for example, high frequency band communications, low latency communications, among other examples) may rely on stringent energy efficiency constraints. In such examples, wireless communications between wireless devices on a communications link 205 may utilize single carrier (SC) waveform communications. The SC waveform communications may support low peak-to-average power ratios (PAPRs), resulting in a higher power amplifier (PA) efficiency and extended battery life for the UE 115-a. Additionally, the SC waveform communications may result in high data rates (for example, in high frequency ranges) due to massive spectrum availability. To facilitate frequency domain equalization (FDE), cyclic prefixes (CPs) may be introduced to create OFDM-like blocks or symbols. A CP may refer to examples such as a guard interval (GI), or a unique word (UW), among other examples.

Although communicating on higher frequency bands (for example, FR4) may result in higher data rates, communication performance on higher frequency bands may be prone to adverse effects from phase noise errors resulting from oscillators at by a transmitting device (for example, the UE 115-a) and a receiving device (for example, a base station 105-a).

In some examples, the UE 115-a may transmit a SC waveform 210 to the base station 105-a on bidirectional communication link 205. The UE 115-a may include, in the SC waveform 210, a CP 215. For phase noise tracking on the SC waveform 210, the UE 115-a may transmit one or more phase tracking reference signals (PTRSs) in the time domain. For instance, the UE 115-a may transmit PTRSs in bursts with a given PTRS pattern (for example, a PTRS size and periodicity) within the SC waveform 210 (for example, an SC symbol). For instance, the UE 115-a may transmit PTRS bursts 220 having a PTRS burst duration 225 over the time domain. In each PTRS burst, PTRS samples may be used by a receiving device (for example, the base station 105-a) to estimate the phase noise across each PTRS burst 220. The receiving device (for example, the base station 105-a) may estimate phase noise values, and may use the estimated phase noise values to compensate for the adverse effects (for example, time varying phase rotations) of the phase noise over data samples (for example, transmitted on the SC waveform 210). The accuracy of such phase noise estimations may depend on the PTRS burst 220 size, PTRS burst duration 225, phase noise statistics, and phase noise estimation and mitigation algorithms.

In some examples (for example, assuming a single path wireless channel), a received SC waveform 210 may be corrupted by additive white Gaussian noise (AWGN), resulting in phase noise. For example, a received signal r[n] may be defined according to Equation 1 below:

$$r[n]=e^{j\theta_{Rx}[n]}(hs[n]e^{j\theta_{Tx}[n]})+w[n] \quad \text{Equation 1:}$$

where n defines an SC symbol size, w[n] defines the AWGN, $\theta_{Rx}[n]$ defines receiver phase noise (for example, at the base station 105-a), and $\theta_{Tx}[n]$ defines the transmitter phase noise (for example, at the UE 115-a), h defines a channel gain, and s[n] is the transmitted signal. Under such a model, channel gain h may be constant across each SC symbol duration and may vary from one SC symbol to another (for example, without loss of generality, h may be assumed to be real). The received signal R may be defined in a matrix format according to Equation 2 below:

$$R=S\Phi+W \quad \text{Equation 2:}$$

where R is defined as $R=[r[0], \ldots, r[N-1]]^T$, S is defined as $S=\text{diag}(hs[1], \ldots, hs[N-1])$, $\Phi$ is defined as $\Phi=[e^{j\theta[0]}, \ldots, e^{j\theta[N-1]}]^T$ and $W=[w[0], \ldots, w[N-1]]^T$, and $\theta[n]$ is defined as $\theta[n]=\theta_{Rx}[n]+\theta_{Tx}[n]$.

In some examples, a receiving device (for example, a base station 105 or a UE 115) may use an estimator to determine and compensate for phase noise. In some examples, the receiving device may not have access to phase noise at the transmitter (for example, statistics of phase noise are unknown to the receiver). In such examples, a phase noise estimator at the receiving device may estimate a common phase error (CPE) based on PTRS samples. The receiving device may compensate corrupted data samples based on the estimated CPE. Such an approach may be suitable for low modulation and coding scheme (MCS) values. For higher MCS values, a receiving device may use a least squares estimator to generate an estimated phase noise vector $\hat{\Phi}$ according to Equation 3 below:

$$\hat{\Phi}=(S^H C_{WW}^{-1} S)^{-1} S^H C_{WW}^{-1} R \quad \text{Equation 3:}$$

where $C_{WW}$ defines a covariance matrix of the AWGN, and $\hat{\Phi}$ represents an estimated phase noise vector over each PTRS burst. To estimate phase noise samples for data 230 (for example, in between PTRS bursts 220 in SC waveform 210), the receiving device may utilize various interpolation techniques (for example, linear, spline, among other examples).

If the receiving device has access to phase noise statistics (for example, for both the receiving device and the transmitting device), the receiving device may be able to more accurately estimate phase noise for a received signal (for example, a SC waveform 210). For instance, with access to phase noise statistics, the receiving device may utilize a minimum mean square error (MMSE) type estimator. In such examples, the receiving device may determine, for example calculate, an estimated phase noise vector $\hat{\Phi}$ over each PTRS burst according to Equation 4 below:

$$\hat{\Phi}=\mathbb{E}[\Phi]+C_{\Phi\Phi}S^H(SC_{\Phi\Phi}S^H+C_{WW})^{-1}(R-S\mathbb{E}[\Phi]) \quad \text{Equation 4:}$$

where $C_{WW}$ defines a covariance matrix of the AWGN, and $C_{\Phi\Phi}$ defines a covariance matrix of the phase noise (for example, a summation of the covariance matrices of transmitter phase noise and receiver phase noise).

If phase noise statistics are known at a receiving device, a resulting estimator may outperform an estimator with unknown phase noise statistics. That is, if a receiving device has access to phase noise data (for example, resulting from oscillators at the transmitting device and resulting from oscillators at the receiving device), then the estimated phase noise will be more accurate, resulting in more effective compensation by the receiving device. Some systems may not support mechanisms for signaling phase noise profiles (for example, phase noise statistics for transmitting devices, receiving devices, or both) for better phase noise mitigation in higher bands, higher MCS values, among other examples.

As described herein, wireless communications in higher bands (for example, FR4), and higher MCSs, among other examples (for example, SC waveform 210) may be particularly sensitive to phase noise that degrades communication performance. That is, phase noise introduced by oscillators at the transmitting device, the receiving device, or both, may have a greater impact on wireless communications in higher bands or using higher MCSs (for example, on FR4), than wireless communications in lower bands (for example, FR1, FR2, among other examples). Phase noise may therefore be a dominant factor in degrading communication performance in higher bands or higher MCSs. Improved accuracy in phase noise estimators at a receiving device may therefore be key in compensating for the adverse effects of phase noise.

Accurate phase noise estimators at a receiving device (for example, an MMSE estimator) may result in more efficient compensation for phase noise errors. Such phase noise estimators may rely on statistics of phase noise for both the transmitting device and the receiving device (for example, a UE 115-a and a base station 105-a). Some systems may not support a mechanism for signaling such phase noise statistics in either direction (for example, via downlink signaling from a base station 105-a to a UE 115-a in the case in which the base station 105-a is the transmitting device, or via uplink signaling from the UE 115-a to the base station 105-a in the case in which the UE 115-a is the transmitting device). Techniques described herein may support signaling a phase noise profile (for example, a phase noise spectrum mask) to the UE 115-a via downlink signaling, or to a base station 105-a via uplink signaling. Such techniques may support a base station 105-a or a UE 115-a in designing or utilizing phase noise estimators (for example, MMSE estimators) to better mitigate phase noise and compensate for resulting adverse effects, resulting in improved throughput.

As described in greater detail with reference to FIG. 3, a UE 115-a may transmit a phase noise profile message 235 to the base station 105-a. The base station 105-a may utilize the received phase noise profile to better estimate phase noise in received uplink signaling (for example, SC waveform 210) from the UE 115-a compared to other techniques. The UE 115-a may perform phase noise measurements to determine (for example, extract) a phase noise profile (for example, a phase noise spectrum mask), and may report the phase noise measurements (for example, the phase noise profile) to the base station 105-a in the phase noise profile message 235. In some examples, the phase noise profile message 235 may be a measurement report. The measurement report may include a new data structure. In some examples, a dedicated measurement report for the phase noise profile may be preconfigured or defined in one or more industry standards. In some examples, one or more fields for the phase noise profile may be added to an existing measurement report data structure. In some examples, the phase noise profile message 235 may be an RRC message. For example, an RRC signaling message for the phase noise profile report may be defined in one or more industry standards. The RRC message may be defined for the purpose of phase noise profile transmissions.

As described in greater detail with reference to FIG. 4, a base station 105-a may transmit the phase noise profile message 235 to the UE 115-a. The UE 115-a may utilize the received phase noise profile to better estimate phase noise in received downlink signaling (for example, an SC waveform 210) from the base station 105-a. The base station 105-a may perform phase noise measurements to extract a phase noise profile and signal the phase noise profile to the UE 115-a (for example, in a phase noise profile message 235). In some examples, phase noise profile message 235 may be a system information block (SIB) message. The SIB message may be defined in one or more industry standards and may be utilized for the purpose of broadcasting a phase noise profile (for example, to one or more UEs 115 located within coverage area 110-a). In some examples, the base station 105-a may transmit the phase noise profile message 235 to the UE 115-a in response to a request. For instance, the UE 115-a may transmit, to the base station 105-a, a request for the phase noise profile. In response, the base station 105-a may transmit a dedicated phase nose profile message or a dedicated phase noise profile update via RRC signaling.

In both examples (for example, a UE 115-a indicating a phase noise profile via uplink signaling, or a base station 105-a indicating a phase noise profile via downlink signaling), one or more scenarios may trigger an updated phase noise profile. For example, a phase noise profile for a transmitting device may need to be updated depending on an operating band, or a temperature, among other examples. In such examples, (for example, in which temperature changes, in which an operating band changes, among other examples), a transmitting device may trigger an update to the phase noise profile, or the receiving device may request an updated phase noise profile. In such examples, a transmitting device may first transmit a baseline phase noise profile (for example, a phase noise spectrum mast). Then, upon detecting or identifying triggering conditions, or upon receiving a request from the receiving device, the transmitting device may transmit an updated phase noise profile. The transmitting device may transmit the updated phase noise profile as one or more delta values of the baseline phase noise profile.

For example, the UE 115-a may be the transmitting device. In such examples, the UE 115-a may perform measurements to generate one or more phase noise statistics in a phase noise profile (for example, a phase noise spectrum mask). The phase noise spectrum mask may be defined by a set of inputs for a simulator for phase noise impairment. Each input may be defined as a phase noise statistical values in units of dB radians squared per Hz. Each input of the set of inputs may correspond to an offset in frequency from a carrier (in Hz). For instance, for a 60 GHz carrier, a phase noise spectrum mask (for example, a baseline phase noise profile) may be represented in Table 1:

TABLE 1

| | Offset Frequency from Carrier (Hz) | | | | | | | |
|---|---|---|---|---|---|---|---|---|
| | 1 K | 5 K | 10 K | 100 K | 187 K | 300 K | 1000 K | 5000 K |
| Phase Noise Mask at Base Station | −72.0 | −77.7 | −79.4 | −82.0 | −82.0 | −93.7 | −106.6 | −120.7 |
| Phase Noise Mask at UE | −65.1 | −72.3 | −74.3 | −77.0 | −77.2 | −81.6 | −92.3 | −106.4 |

The transmitting device (for example, the UE 115-a) may indicate the phase noise spectrum mask as a table, or as a set of values (for example, transmitted at respective frequency offsets from the carrier for that frequency offset), or another alternative. In some examples, one or more conditions or parameter values may change (for example, a change in one or more parameters, such as temperature, voltage, operating band, among other examples). The change in parameters or conditions may result in a change in a phase noise profile for the transmitting device (for example, the UE 115-a), the receiving device (for example, the base station 105-a), or both. Example changes to phase noise profiles are illustrated with reference to Table 2:

TABLE 2

| Offset Frequency from Carrier (Hz) | 1K | 5K | 10K | 100K | 187K | 300K | 1000K | 5000K |
|---|---|---|---|---|---|---|---|---|
| Phase Noise Mask at Base Station $\left(\frac{dB \times rad^2}{Hz}\right)$ | −72.0 | −77.7 | −79.4 | −82.0 | −82.0 | −93.7 | −106.6 | −120.7 |
| Change to Phase Noise Mask at Base Station | 0 | 0 | 2.3 | 0 | 5.6 | 0 | 0 | 0 |
| Phase Noise Mask at UE | −65.1 | −72.3 | −74.3 | −77.0 | −77.2 | −81.6 | −92.3 | −106.4 |
| Change to Phase Noise Mask at UE ) $\left(\frac{dB \times rad^2}{Hz}\right)$ | 0 | 1.20 | 0 | 0 | 3.7 | 0 | 0 | 0 |

Upon detecting on or more triggering events (for example, a change in one or more parameters, such as temperature, voltage, operating band, among other examples), the UE 115-a may transmit an updated phase noise profile. The UE 115-a may perform one or more measurements to determine a current or updated set of phase noise statistics (for example, to determine the change to the phase noise mask at the UE 115-a). The UE 115-a may transmit an updated phase noise profile to the base station 105-a. The transmitting device may transmit the updated phase noise profile as a set of delta values to the baseline phase noise mask. For instance, instead of transmitting a full table or full set of values (for example, a new, complete, phase noise mask), the UE 115-a may transmit an indication of delta values (for example, changes to the phase noise mask). In some examples, the UE 115-a may transmit the full set of deltas (for example, a change to the phase noise mask at an offset of 5,000 Hz from the center frequency of the 60 GHz channel and a change to the phase noise mask at an offset of 187,000 Hz from the center frequency of the 60 GHz channel) on a single frequency. Or, in some examples, the UE 115-a may transmit individual deltas on corresponding frequencies. For instance, the UE 115-a may transmit an indication of the change in the phase noise mask at the offset of 5,000 Hz from the center frequency at the corresponding frequency offset (for example, 5,000 Hz from the center frequency), and may also transmit an indication of the change in the phase noise mask at the offset of 187,000 Hz from the center frequency at the corresponding frequency offset (for example, 187,000 from the center frequency).

Having received an updated phase noise spectral mask for the UE 115-a, and having determined any relevant changes to the phase noise spectral mask at the base station 105-a, the base station 105-a may update its estimator using the updated phase noise statistics for the UE 115-a and for the base station 105-a, and may more accurately estimate and compensate for phase noise issues upon receiving data 230. In some examples, to find the phase noise covariance matrix for phase noise estimation (for example, MMSE estimation) and mitigation, the receiving device (for example, the base station 105-a) may utilize an inverse Fourier transform. For example, one a phase noise spectrum mask, or an updated phase noise spectrum mask, has been signaled, an inverse Fourier transform may result in the covariance matrix, which may be used to in a phase noise estimator as described herein.

A base station that is the transmitting device may perform similar techniques for downlink signaling. That is, if the base station 105-a is the transmitting device, and the UE 115-a is the receiving device, then the base station 105-a may transmit a baseline phase noise profile (for example, phase noise spectrum mask), and may then (for example, upon detecting one or more triggering events), may transmit an updated phase noise profile. As escribed herein, a transmitting device (for example, the base station 105-a or the UE 115-a) may transmit the updated phase noise profile as a full set of values, an updated set of values, a subset of values (for example, a set of deltas for frequency offsets from a center frequency of a channel in which a change has occurred), or any combination thereof. The transmitting device may transmit the delta values of the updated phase noise profile together on a single frequency, or separately on corresponding frequencies (for example, frequency offsets in which the deltas are to be applied).

Figure 3:
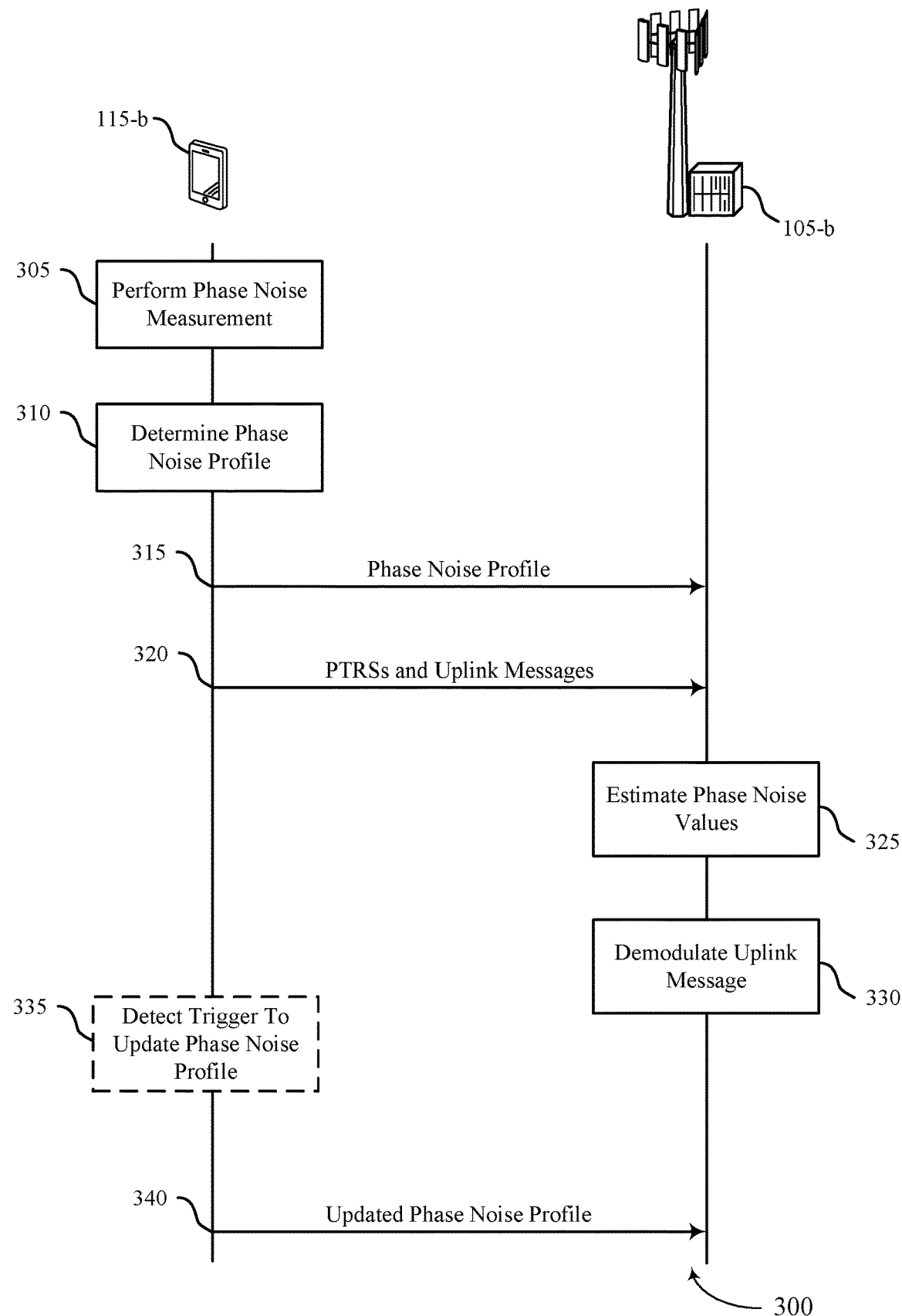
FIG. 3 illustrates an example of a process flow that supports phase noise profile signaling for a single carrier waveform in accordance with aspects of the present disclosure.

FIG. 3 illustrates an example of a process flow 300 that supports phase noise profile signaling for a single carrier waveform in accordance with aspects of the present disclosure. Process flow 300 may include a base station 105-b and a UE 115-b, which may be examples of corresponding devices described with reference to FIGS. 1-2.

At 305, the UE 115-b may perform one or more phase noise measurements. The one or more phase noise measurements may be associated with a single carrier. The UE 115-b may generate one or more phase noise statistical values based on the phase noise measurements.

At 310, the UE 115-b may determine a phase noise profile for the UE 115-b based on the one or more phase noise profiles. The phase noise profile may include the phase noise statistical values. The phase noise statistical values included in the phase noise profile may include a set of phase variation values, each phase variation value being associated with a respective offset from a center frequency of the single carrier, as described in greater detail with reference to table 1 in FIG. 2.

At 315, the UE 115-b may transmit, and the base station 105-b may receive, an indication of a phase noise profile. For example, The UE 115-b may transmit a measurement report including the indication of the phase noise profile. In some examples, the UE 115-b may transmit an RRC message including the phase noise profile.

At 320, the UE 115-b may transmit, and the base station 105-b may receive, one or more uplink messages and one or more PTRSs based at least in part on the phase noise profile (which may include the one or more phase noise statistical values). For instance, the UE 115-*b* may transmit a SC waveform as described with reference to FIG. 2. The UE 115-*b* may transmit one or more PTRS bursts interspersed with data transmissions (for example, the uplink messages).

At 325, the base station 105-*b* may estimate one or more phase noise values based at least in part on the PTRSs and the phase noise statistical values of the phase noise profile. In some examples, the base station 105-*b* may perform one or more phase noise measurements associated with the single carrier to generate phase noise statistical values for base station 105-*b*. As described with reference to FIG. 2, the base station 105-*b* may utilize received PTRSs and a phase noise estimator that relies on both measured base station 105-*b* phase noise statistical values and received UE 115-*b* phase noise statistical values. That is, by accounting for both phase noise at the UE 115-*b* and phase noise at the base station 105-*b*, the base station 105-*b* may accurately estimate and compensate for phase noise.

At 330, the base station 105-*b* may demodulate the uplink message based at least in part on the one or more phase noise values. That is, the base station 105-*b* may utilize received phase noise statistical values to accurately estimate and compensate for phase noise errors at the UE 115-*b* or the base station 105-*b*.

At 335, the UE 115-*b* may detect a triggering event that triggers updating one or more phase noise statistical values. The triggering event may include a change in temperature, a change in voltage, a change in transmit power (for example, determined by the UE 115-*b*, indicated by the base station 105-*b*, among other examples), a change in an operating band (for example, as instructed by the base station 105-*b*), or any combination thereof. In some examples, the triggering event may include receiving a request from the base station 105-*b* to indicate an updated phase noise profile. For instance, the base station 105-*b* may detect one or more triggers for an updated phase noise profile, or a change in a phase noise profile at the base station 105-*b*, and may request an updated phase noise profile for the UE 115-*b*.

At 340, the UE 115-*b* may transmit an updated phase noise profile to the base station 105-*b* based at least in part on detecting the trigger. In some examples, the UE 115-*b* may transmit a set of updated phase noise statistical values associated with a respective set of offsets from a center frequency of the single carrier on frequency resources associated with one offset of the set of offsets. In some examples, the UE 115-*b* may transmit a set of updated phase noise statistical values on frequency resources associated with offsets from the center frequency to which the updated phase noise statistical values are to be applied. For instance, the UE 115-*b* may transmit a first updated phase noise statistical value associated with a first offset from a center frequency of the single carrier on frequency resources associated with the first offset, and may transmit a second updated phase noise statistical value associated with a second offset from the center frequency of the single carrier on frequency resources associated with the second offset.

In some examples, the UE 115-*b* may not transmit updated phase noise statistical values for certain frequency offsets (for example, that exceed a threshold). For instance, the base station 105-*b* may transmit, and the UE 115-*b* may receive, an indication of a threshold frequency and an indication not to indicate updated phase noise statistical values associated with one or more offsets from the center frequency of the single carrier that satisfy the threshold frequency. That is, the UE 115-*b* may receive an instruction from the base station 105-*b* that the UE 115-*b* is to refrain from reporting updated phase noise statistical values for some frequencies. For instance, with reference to FIG. 2, the base station 105-*b* may indicate that the UE 115-*b* is not to report updated phase statistical values for frequency offsets of 300,000 Hz from the center frequency, or higher. In such examples, the UE 115-*b* may refrain from transmitting updated phase noise statistical values for frequency offsets of 300,000 Hz or higher (for example, an offset of 300,000 Hz, 1,000,000, 5,000,000 Hz, among other examples).

Figure 4:
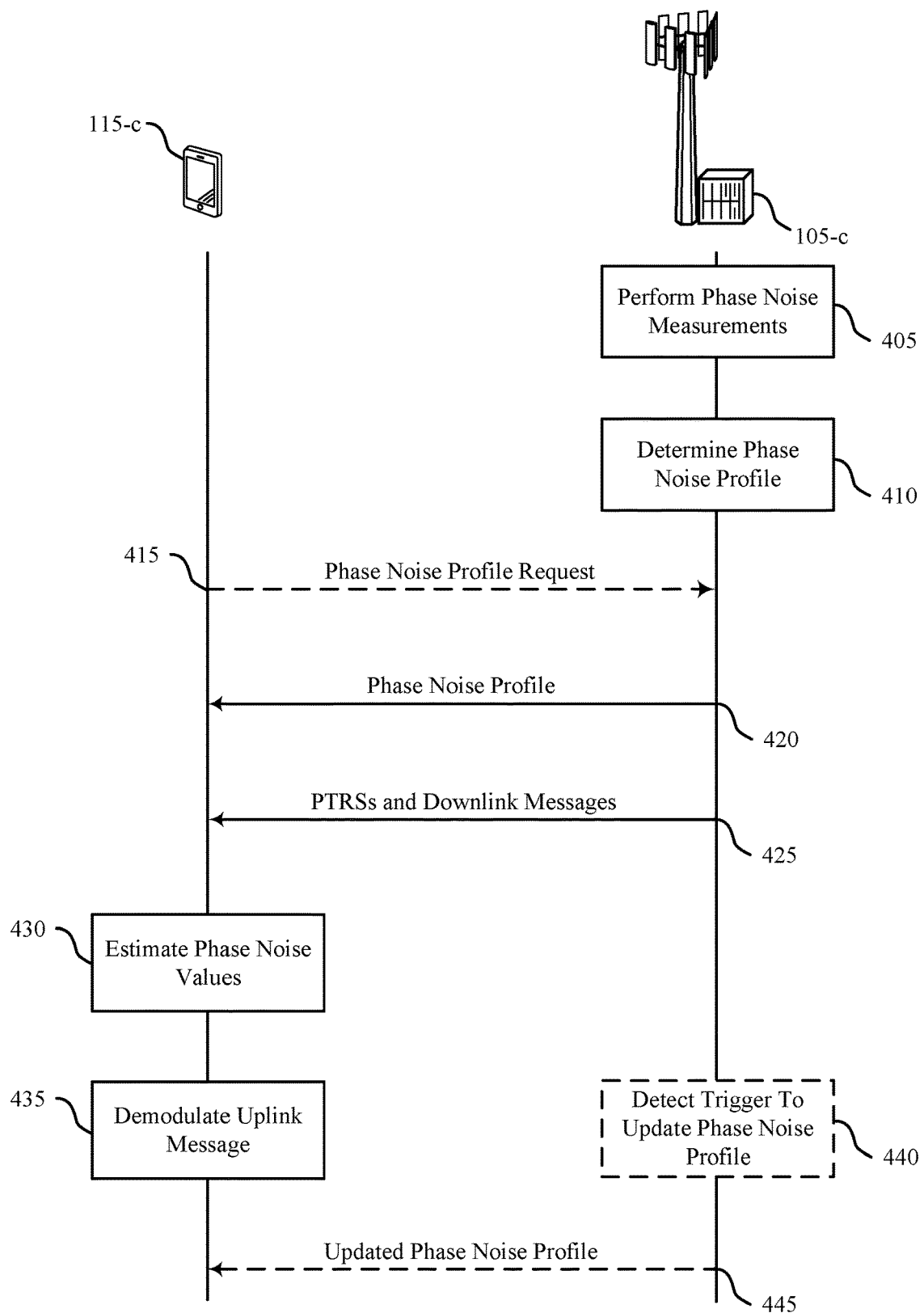
FIG. 4 illustrates an example of a process flow that supports phase noise profile signaling for a single carrier waveform in accordance with aspects of the present disclosure.

FIG. 4 illustrates an example of a process flow 400 that supports phase noise profile signaling for a single carrier waveform in accordance with aspects of the present disclosure. Process flow 400 may include a UE 115-*c* and a base station 105-*c*, which may be examples of corresponding devices described with reference to FIGS. 1-3.

At 405, the base station 105-*c* may perform one or more phase noise measurements. The one or more phase noise measurements may be associated with a single carrier. The base station 105-*c* may generate one or more phase noise statistical values based on the measurements.

At 410, the base station 105-*c* may determine a phase noise profile for the base station 105-*c* based at least in part on the one or more phase noise measurements. The phase noise profile may include the phase noise statistical values determined at 405. The phase noise statistical values included in the phase noise profile may include a set of phase variation values, each phase variation value being associated with a respective offset from a center frequency of the single carrier, as described in greater detail with reference to table 1 in FIG. 2.

At 420, the base station 105-*c* may transmit, and the UE 115-*c* may receive, an indication of the phase noise profile (for example, one or more phase noise statistical values based at least in part on the one or more phase noise measurements). In some examples, the base station 105-*c* may transmit a broadcast message (for example, in a SIB) including the indication of the phase noise profile. In some examples, the base station 105-*c* may transmit the indication of the phase noise profile via an RRC message. For example, at 415, the UE 115-*c* may transmit a phase noise profile request message (for example, an RRC message), requesting that the base station 105-*c* transmit the phase noise profile at 420 (for example, or an updated phase noise profile at 445).

At 425, the base station 105-*c* may transmit, and the UE 115-*c* may receive, one or more PTRSs and one or more downlink messages. For instance, base station the 105-*c* may transmit a SC waveform as described with reference to FIG. 2. The UE 115-*b* may transmit one or more PTRS bursts interspersed with data transmissions (for example, the uplink messages).

At 430, the UE 115-*c* may estimate phase noise values based at least in part on the one or more PTRSs and the one or more phase noise statistical values of the phase noise profile received at 420. In some examples, the UE 115-*c* may perform one or more phase noise measurements associated with the single carrier to generate phase noise statistical values for the UE 115-*c*. As described with reference to FIG. 2, the UE 115-*c* may utilize received PTRSs and a phase noise estimator that relies on both received base station 105-*b* phase noise statistical values and determined UE 115-*b* phase noise statistical values. That is, by taking into account both phase noise at the UE 115-*b* and phase noise at the base station 105-*b*, the UE 115-*c* may accurately estimate and compensate for phase noise.

At 435, the UE 115-*c* may demodulate the downlink message based at least in part on the one or more phase noise values. That is, the UE 115-c may utilize received phase noise statistical values to accurately estimate and compensate for phase noise errors at the UE 115-b or the base station 105-b.

At 440, the base station 105-c may detect a triggering event, which may trigger an update to one or more phase noise statistical values. The triggering event may include a change in temperature, a change in voltage, a change in transmit power, a change in an operating band (for example, indicated to the UE 115-c by the base station 105-c), or any combination thereof. In some examples, the triggering event may include receiving a request from the UE 115-c to indicate an updated phase noise profile. For instance, the UE 115-c may detect one or more triggers for an updated phase noise profile, or a change in a phase noise profile at the UE 115-c, and may request an updated phase noise profile for the base station 105-c.

At 445, the base station 105-c may transmit an updated phase noise profile to the UE 115-c based at least in part on detecting the trigger. In some examples, the base station 105-c may transmit a set of updated phase noise statistical values associated with a respective set of offsets from a center frequency of the single carrier on frequency resources associated with one offset of the set of offsets. In some examples, the base station 105-c may transmit a set of updated phase noise statistical values on frequency resources associated with offsets from the center frequency to which the updated phase noise statistical values are to be applied. For instance, the base station 105-c may transmit a first updated phase noise statistical value associated with a first offset from a center frequency of the single carrier on frequency resources associated with the first offset, and may transmit a second updated phase noise statistical value associated with a second offset from the center frequency of the single carrier on frequency resources associated with the second offset.

In some examples, the base station 105-c may not transmit updated phase noise statistical values for certain frequency offsets (for example, that exceed a threshold). For instance, the base station 105-c may refrain from reporting updated phase noise statistical values for some frequencies. For instance, the base station 105-c may not report updated phase statistical values for frequency offsets of 300,000 Hz from the center frequency, or higher. In such examples, the UE 115-b may refrain from transmitting updated phase noise statistical values for frequency offsets of 300,000 Hz or higher (for example, an offset of 300,000 Hz, 1,000,000, 5,000,000 Hz, among other examples).

Figure 5:
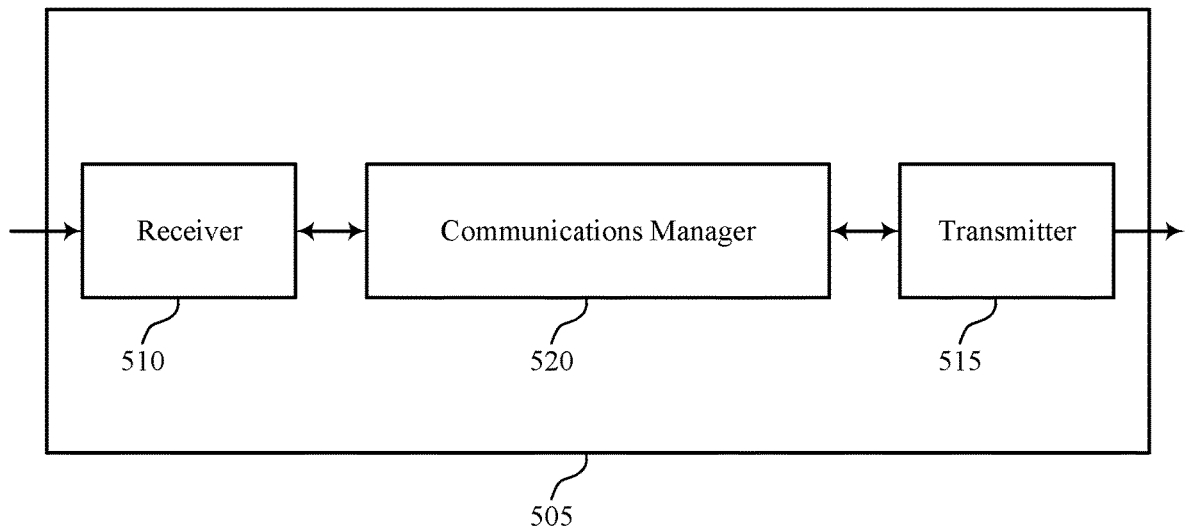
FIGS. 5 and 6 show block diagrams of devices that support phase noise profile signaling for a single carrier waveform in accordance with aspects of the present disclosure.

FIG. 5 shows a block diagram of a device 505 that supports phase noise profile signaling for a single carrier waveform in accordance with aspects of the present disclosure. The device 505 may be an example of aspects of a UE 115 as described herein. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to phase noise profile signaling for a single carrier waveform). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to phase noise profile signaling for a single carrier waveform). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of phase noise profile signaling for a single carrier waveform as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 520 may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for performing, by the UE, one or more phase noise measurements associated with a single carrier. The communications manager 520 may be configured as or otherwise support a means for transmitting, to a base station, one or more phase noise statistical values based at least in part on the one or more phase noise measurements. The communications manager 520 may be configured as or otherwise support a means for transmitting, to the base station, one or more uplink messages and one or more phase tracking reference signals based on the one or more phase noise statistical values.

Additionally, or alternatively, the communications manager 520 may support wireless communications at a UE in accordance with examples as disclosed herein. For example, the communications manager 520 may be configured as or otherwise support a means for receiving, from a base station, an indication of one or more phase noise statistical values for the base station associated with a single carrier. The communications manager 520 may be configured as or otherwise support a means for receiving, from the base station, one or more downlink messages and one or more phase tracking reference signals based on one or more phase noise statistical values. The communications manager 520 may be configured as or otherwise support a means for estimating one or more phase noise values based on the one or more phase tracking reference signals and the one or more phase noise statistical values. The communications manager 520 may be configured as or otherwise support a means for demodulating the one or more downlink messages based on the one or more phase noise values.

By including or configuring the communications manager 520 in accordance with examples as described herein, the device 505 (for example, a processor controlling or otherwise coupled to the receiver 510, the transmitter 515, the communications manager 520, or a combination thereof) may support techniques for improved phase noise estimation based on signaling of phase noise statistical values between transmitting and receiving devices. Described techniques may result in improved throughput, decreased negative impact of phase noise errors, improved reliability of wireless communications, and decreased system latency, among other advantages.

Figure 6:
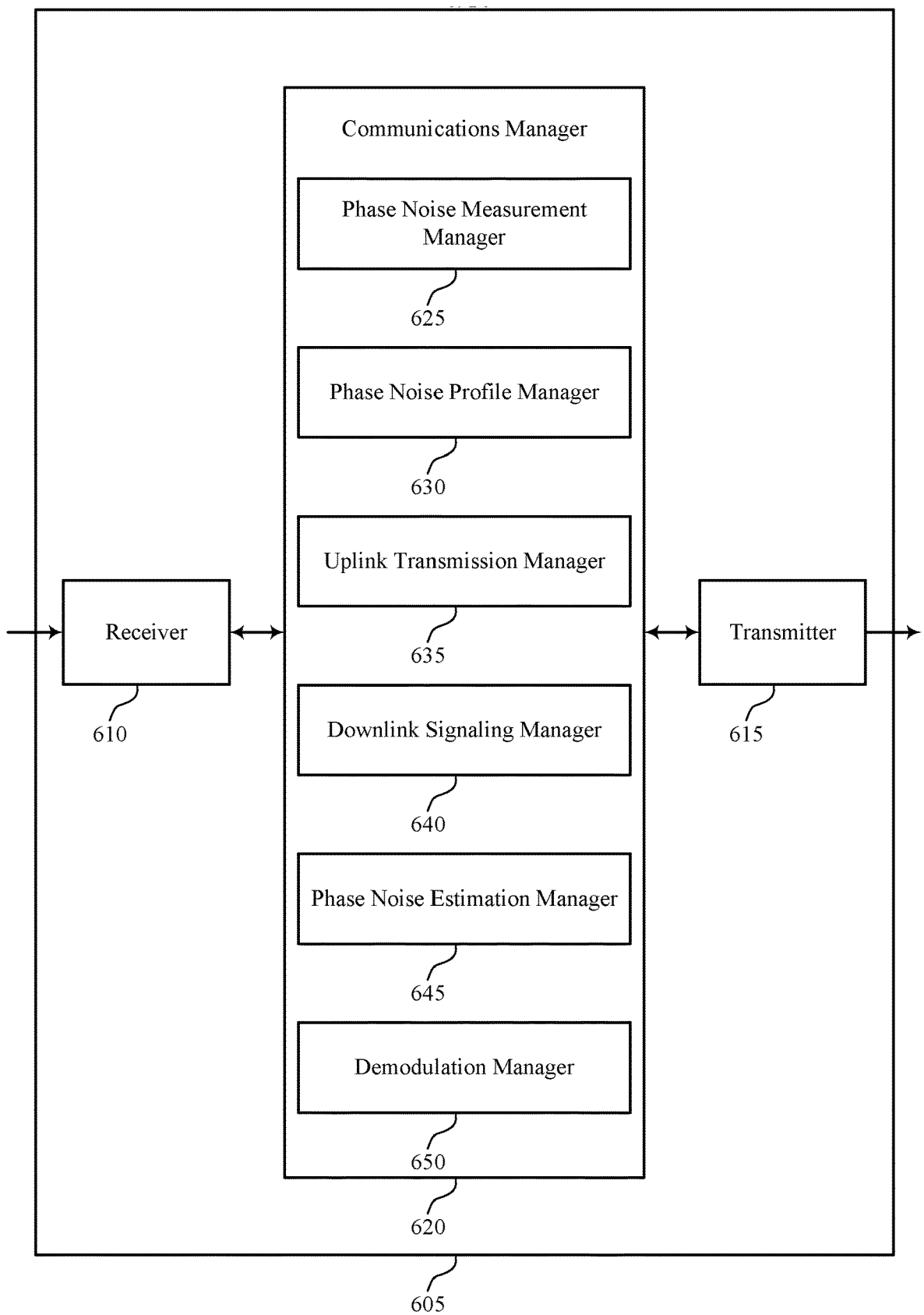

FIG. 6 shows a block diagram of a device 605 that supports phase noise profile signaling for a single carrier waveform in accordance with aspects of the present disclosure. The device 605 may be an example of aspects of a device 505 or a UE 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to phase noise profile signaling for a single carrier waveform). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to phase noise profile signaling for a single carrier waveform). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of phase noise profile signaling for a single carrier waveform as described herein. For example, the communications manager 620 may include a phase noise measurement manager 625, a phase noise profile manager 630, an uplink transmission manager 635, a downlink signaling manager 640, a phase noise estimation manager 645, a demodulation manager 650, or any combination thereof. In some examples, the communications manager 620, or various components thereof, may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The phase noise measurement manager 625 may be configured as or otherwise support a means for performing, by the UE, one or more phase noise measurements associated with a single carrier. The phase noise profile manager 630 may be configured as or otherwise support a means for transmitting, to a base station, one or more phase noise statistical values based at least in part on the one or more phase noise measurements. The uplink transmission manager 635 may be configured as or otherwise support a means for transmitting, to the base station, one or more uplink messages and one or more phase tracking reference signals based on the one or more phase noise statistical values.

Additionally, or alternatively, the communications manager 620 may support wireless communications at a UE in accordance with examples as disclosed herein. The phase noise profile manager 630 may be configured as or otherwise support a means for receiving, from a base station, an indication of a phase noise profile for the base station associated with a single carrier. The downlink signaling manager 640 may be configured as or otherwise support a means for receiving, from the base station, one or more downlink messages and one or more phase tracking reference signals based on the one or more phase noise statistical values. The phase noise estimation manager 645 may be configured as or otherwise support a means for estimating one or more phase noise values based on the one or more phase tracking reference signals and the one or more phase noise statistical values. The demodulation manager 650 may be configured as or otherwise support a means for demodulating the one or more downlink messages based on the one or more phase noise values.

Figure 7:
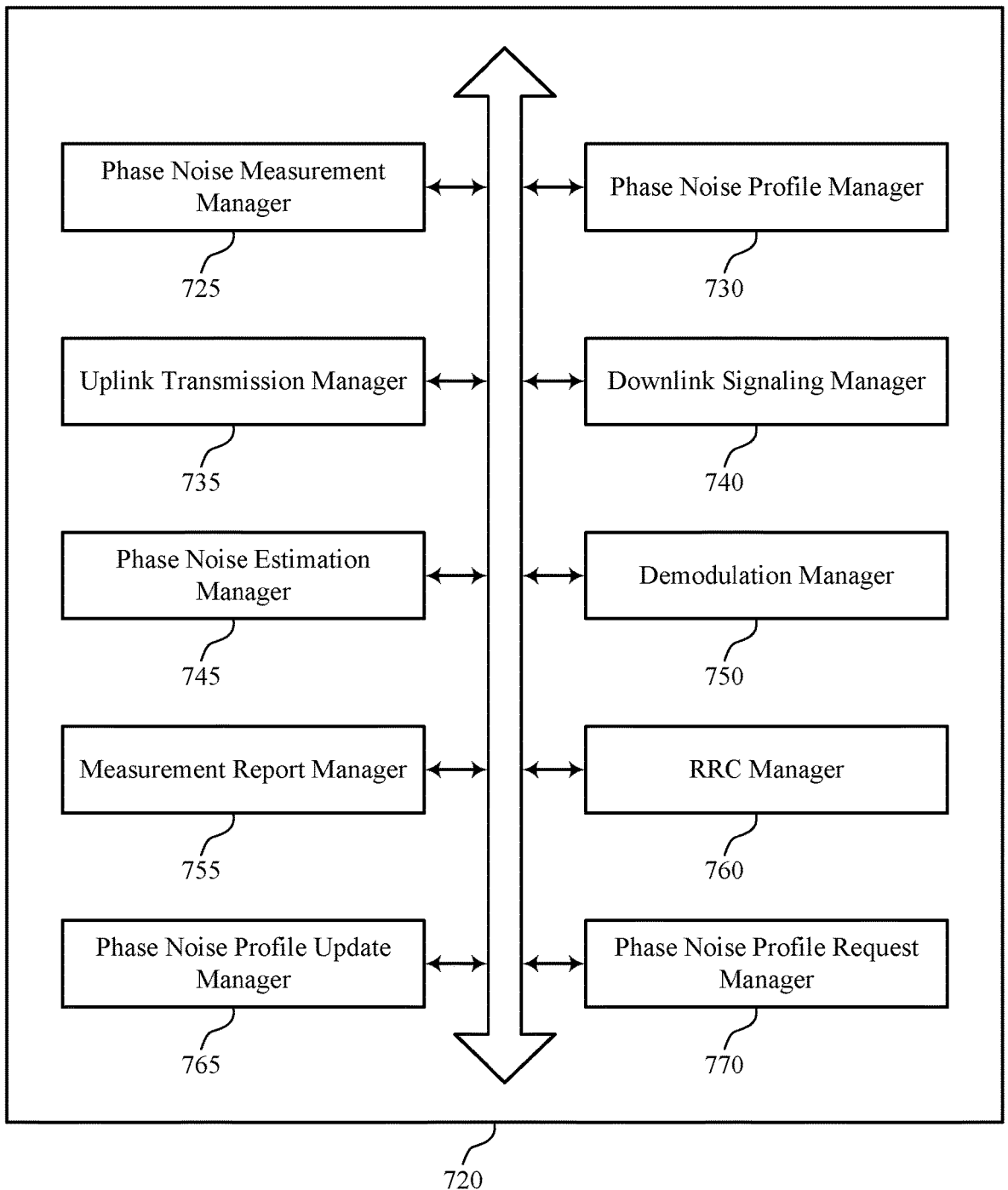
FIG. 7 shows a block diagram of a communications manager that supports phase noise profile signaling for a single carrier waveform in accordance with aspects of the present disclosure.

FIG. 7 shows a block diagram of a communications manager 720 that supports phase noise profile signaling for a single carrier waveform in accordance with aspects of the present disclosure. The communications manager 720, or various components thereof, may be an example of means for performing various aspects of phase noise profile signaling for a single carrier waveform as described herein. For example, the communications manager 720 may include a phase noise measurement manager 725, a phase noise profile manager 730, an uplink transmission manager 735, a downlink signaling manager 740, a phase noise estimation manager 745, a demodulation manager 750, a measurement report manager 755, an RRC manager 760, a phase noise profile update manager 765, a phase noise profile request manager 770, or any combination thereof. Each of these components may communicate, directly or indirectly, with one another (for example, via one or more buses).

The communications manager 720 may support wireless communications at a UE in accordance with examples as disclosed herein. The phase noise measurement manager 725 may be configured as or otherwise support a means for performing, by the UE, one or more phase noise measurements associated with a single carrier. In some examples, the phase noise profile manager 730 may be configured as or otherwise support a means for transmitting, to a base station, one or more phase noise statistical values based at least in part on the one or more phase noise measurements. The uplink transmission manager 735 may be configured as or otherwise support a means for transmitting, to the base station, one or more uplink messages and one or more phase tracking reference signals based on the one or more phase noise statistical values. The phase noise profile manager 730 may be configured as or otherwise support a means for determining, based at least in part on the one or more phase noise measurements, a phase noise profile including the one or more phase noise statistical values.

In some examples, the measurement report manager 755 may be configured as or otherwise support a means for transmitting the indication of the one or more phase noise statistical values in a measurement report.

In some examples, the RRC manager 760 may be configured as or otherwise support a means for transmitting the one or more phase noise statistical values in a radio resource control message.

In some examples, the one or more phase noise statistical values include a set of phase variation values, each phase variation value being associated with a respective offset from a center frequency of the single carrier.

In some examples, the phase noise profile update manager 765 may be configured as or otherwise support a means updating one or more of the phase noise statistical values based at least in part on a triggering event. In some examples, the phase noise profile update manager 765 may be configured as or otherwise support a means for transmitting, to the base station, an indication of the one or more updated phase noise statistical values based on detecting the triggering event and transmitting the one or more phase noise statistical values.

In some examples, to support trigger to update one or more of the phase noise statistical values, the phase noise profile update manager 765 may be configured as or otherwise support a means for a change in temperature, a change in voltage, a change in transmit power, a change in an operating band, or any combination thereof.

In some examples, to support transmitting the indication of the updated one or more phase noise statistical values, the phase noise profile update manager 765 may be configured as or otherwise support a means for transmitting a set of updated phase noise statistical values associated with a respective set of offsets from a center frequency of the single carrier on frequency resources associated with one offset of the set of offsets.

In some examples, to support transmitting the indication of the updated one or more phase noise statistical values, the phase noise profile update manager 765 may be configured as or otherwise support a means for transmitting a first updated phase noise statistical value associated with a first offset from a center frequency of the single carrier on frequency resources associated with the first offset. In some examples, to support transmitting the indication of the updated one or more phase noise statistical values, the phase noise profile update manager 765 may be configured as or otherwise support a means for transmitting a second updated phase noise statistical value associated with a second offset from the center frequency of the single carrier on frequency resources associated with the second offset.

In some examples, the phase noise profile update manager 765 may be configured as or otherwise support a means for receiving, from the base station, an indication of a threshold frequency and an indication not to indicate updated phase noise statistical values associated with one or more offsets from a center frequency of the single carrier that satisfy the threshold frequency. In some examples, the phase noise profile update manager 765 may be configured as or otherwise support a means for refraining from transmitting an indication of updated phase noise statistical values associated with the one or more offsets from the center frequency of the single carrier that satisfy the threshold frequency.

Additionally, or alternatively, the communications manager 720 may support wireless communications at a UE in accordance with examples as disclosed herein. In some examples, the phase noise profile manager 730 may be configured as or otherwise support a means for receiving, from a base station, one or more phase noise statistical values for the base station associated with a single carrier. The downlink signaling manager 740 may be configured as or otherwise support a means for receiving, from the base station, one or more downlink messages and one or more phase tracking reference signals based on the one or more phase noise statistical values. The phase noise estimation manager 745 may be configured as or otherwise support a means for estimating one or more phase noise values based on the one or more phase tracking reference signals and the one or more phase noise statistical values. The demodulation manager 750 may be configured as or otherwise support a means for demodulating the one or more downlink messages based on the one or more phase noise values.

In some examples, to support receiving the one or more phase noise statistical values, the phase noise profile manager 730 may be configured as or otherwise support a means for receiving a broadcast message including the one or more phase noise statistical values.

In some examples, the phase noise profile request manager 770 may be configured as or otherwise support a means for transmitting, to the base station, a request for the one or more phase noise statistical values, where receiving the one or more phase noise statistical values is based on transmitting the request, and where receiving the one or more phase noise statistical values includes receiving a radio resource control message.

In some examples, the phase noise profile update manager 765 may be configured as or otherwise support a means for receiving, from the base station, an indication of one or more updated phase noise statistical values based on receiving the one or more phase noise statistical values.

In some examples, to support receiving the indication of the updated one or more phase noise statistical values, the phase noise profile update manager 765 may be configured as or otherwise support a means for receiving a set of updated phase noise statistical values associated with a respective set of offsets from a center frequency of the single carrier on frequency resources associated with one offset of the set of offsets.

In some examples, to support receiving the indication of the one or more updated phase noise statistical values, the phase noise profile update manager 765 may be configured as or otherwise support a means for receiving a first updated phase noise statistical value associated with a first offset from a center frequency of the single carrier on frequency resources associated with the first offset. In some examples, to support receiving the indication of the one or more updated phase noise statistical values, the phase noise profile update manager 765 may be configured as or otherwise support a means for receiving a second updated phase noise statistical value associated with a second offset from the center frequency of the single carrier on frequency resources associated with the second offset.

Figure 8:
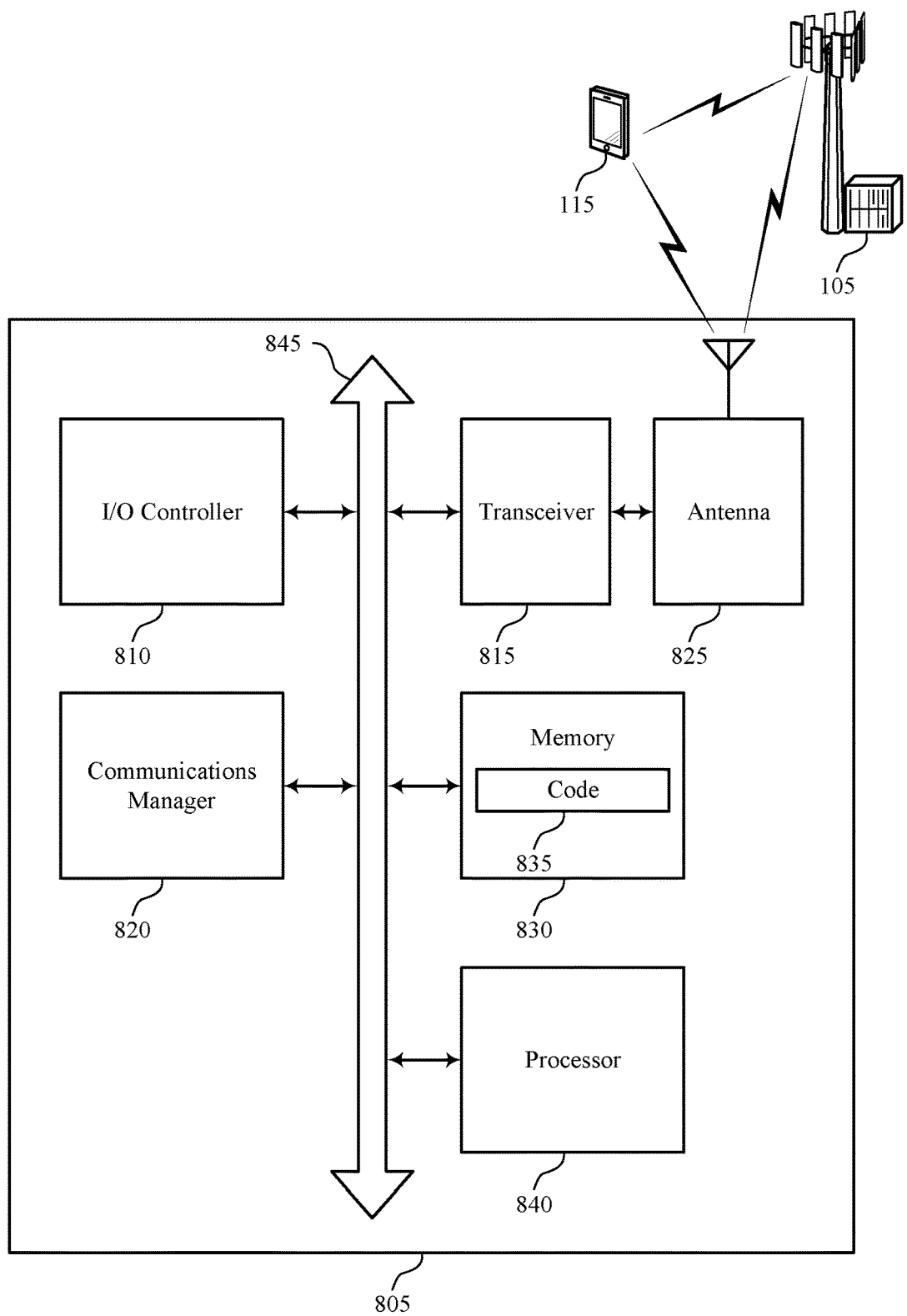
FIG. 8 shows a diagram of a system including a device that supports phase noise profile signaling for a single carrier waveform in accordance with aspects of the present disclosure.

FIG. 8 shows a diagram of a system including a device 805 that supports phase noise profile signaling for a single carrier waveform in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some examples, the I/O controller 810 may represent a physical connection or port to an external peripheral. In some examples, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some examples, the I/O controller 810 may be implemented as part of a processor, such as the processor 840. In some examples, a user may interact with the device 805 via the I/O controller 810 or via hardware components controlled by the I/O controller 810.

In some examples, the device 805 may include a single antenna 825. However, in some other examples, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some examples, the code 835 may not be directly executable by the processor 840 but may cause a computer (for example, when compiled and executed) to perform functions described herein. In some examples, the memory 830 may contain, among other things, a basic I/O system (BIOS) which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some other examples, a memory controller may be integrated into the processor 840. The processor 840 may be configured to execute computer-readable instructions stored in a memory (for example, the memory 830) to cause the device 805 to perform various functions (for example, functions or tasks supporting phase noise profile signaling for a single carrier waveform). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for performing, by the UE, one or more phase noise measurements associated with a single carrier. The communications manager 820 may be configured as or otherwise support a means for transmitting, to a base station, one or more phase noise statistical values based at least in part on the one or more phase noise measurements. The communications manager 820 may be configured as or otherwise support a means for transmitting, to the base station, one or more uplink messages and one or more phase tracking reference signals based on the phase noise profile.

Additionally, or alternatively, the communications manager 820 may support wireless communications at a UE in accordance with examples as disclosed herein. For example, the communications manager 820 may be configured as or otherwise support a means for receiving, from a base station, an indication of a phase noise profile for the base station associated with a single carrier, the phase noise profile including one or more phase noise statistical values. The communications manager 820 may be configured as or otherwise support a means for receiving, from the base station, one or more downlink messages and one or more phase tracking reference signals based on the phase noise profile. The communications manager 820 may be configured as or otherwise support a means for estimating one or more phase noise values based on the one or more phase tracking reference signals and the one or more phase noise statistical values of the phase noise profile. The communications manager 820 may be configured as or otherwise support a means for demodulating the one or more downlink messages based on the one or more phase noise values.

By including or configuring the communications manager 820 in accordance with examples as described herein, the device 805 may support techniques for improved phase noise estimation based on signaling of phase noise statistical values between transmitting and receiving devices. Described techniques may result in improved throughput, decreased negative impact of phase noise errors, improved reliability of wireless communications, and decreased system latency, among other advantages.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of phase noise profile signaling for a single carrier waveform as described herein, or the processor 840 and the memory 830 may be otherwise configured to perform or support such operations.

Figure 9:
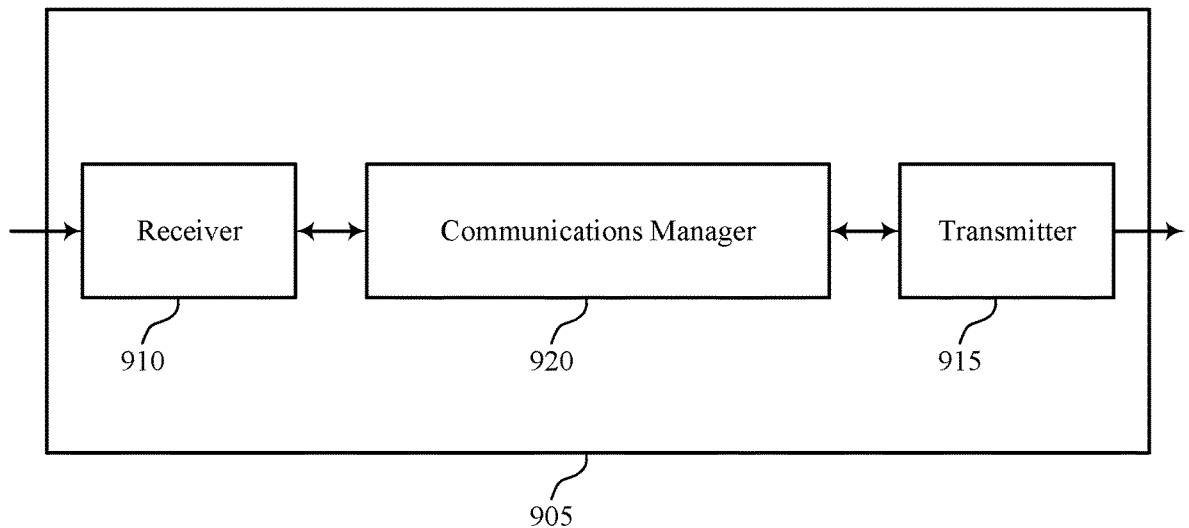
FIGS. 9 and 10 show block diagrams of devices that support phase noise profile signaling for a single carrier waveform in accordance with aspects of the present disclosure.

FIG. 9 shows a block diagram of a device 905 that supports phase noise profile signaling for a single carrier waveform in accordance with aspects of the present disclosure. The device 905 may be an example of aspects of a base station 105 as described herein. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to phase noise profile signaling for a single carrier waveform). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to phase noise profile signaling for a single carrier waveform). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of phase noise profile signaling for a single carrier waveform as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 920, the receiver 910, the transmitter 915, or various combinations or components thereof may be implemented in code (for example, as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, an indication of a phase noise profile for the UE associated with a single carrier, the phase noise profile including one or more phase noise statistical values. The communications manager 920 may be configured as or otherwise support a means for receiving, from the UE, one or more uplink messages and one or more phase tracking reference signals based on the phase noise profile. The communications manager 920 may be configured as or otherwise support a means for estimating one or more phase noise values based on the one or more phase tracking reference signals and the one or more phase noise statistical values of the phase noise profile. The communications manager 920 may be configured as or otherwise support a means for demodulating the one or more uplink messages based on the one or more phase noise values.

Additionally, or alternatively, the communications manager 920 may support wireless communications at a base station in accordance with examples as disclosed herein. For example, the communications manager 920 may be configured as or otherwise support a means for performing, by the base station, one or more phase noise measurements associated with a single carrier for the base station. The communications manager 920 may be configured as or otherwise support a means for transmitting, to a UE, one or more phase noise statistical values based at least in part on the one or more phase noise measurements. The communications manager 920 may be configured as or otherwise support a means for transmitting, to the UE, one or more downlink messages and one or more phase tracking reference signals based on the phase noise profile.

By including or configuring the communications manager 920 in accordance with examples as described herein, the device 905 (for example, a processor controlling or otherwise coupled to the receiver 910, the transmitter 915, the communications manager 920, or a combination thereof) may support techniques for improved phase noise estimation based on signaling of phase noise statistical values between transmitting and receiving devices. Described techniques may result in improved throughput, decreased negative impact of phase noise errors, improved reliability of wireless communications, and decreased system latency, among other advantages.

Figure 10:
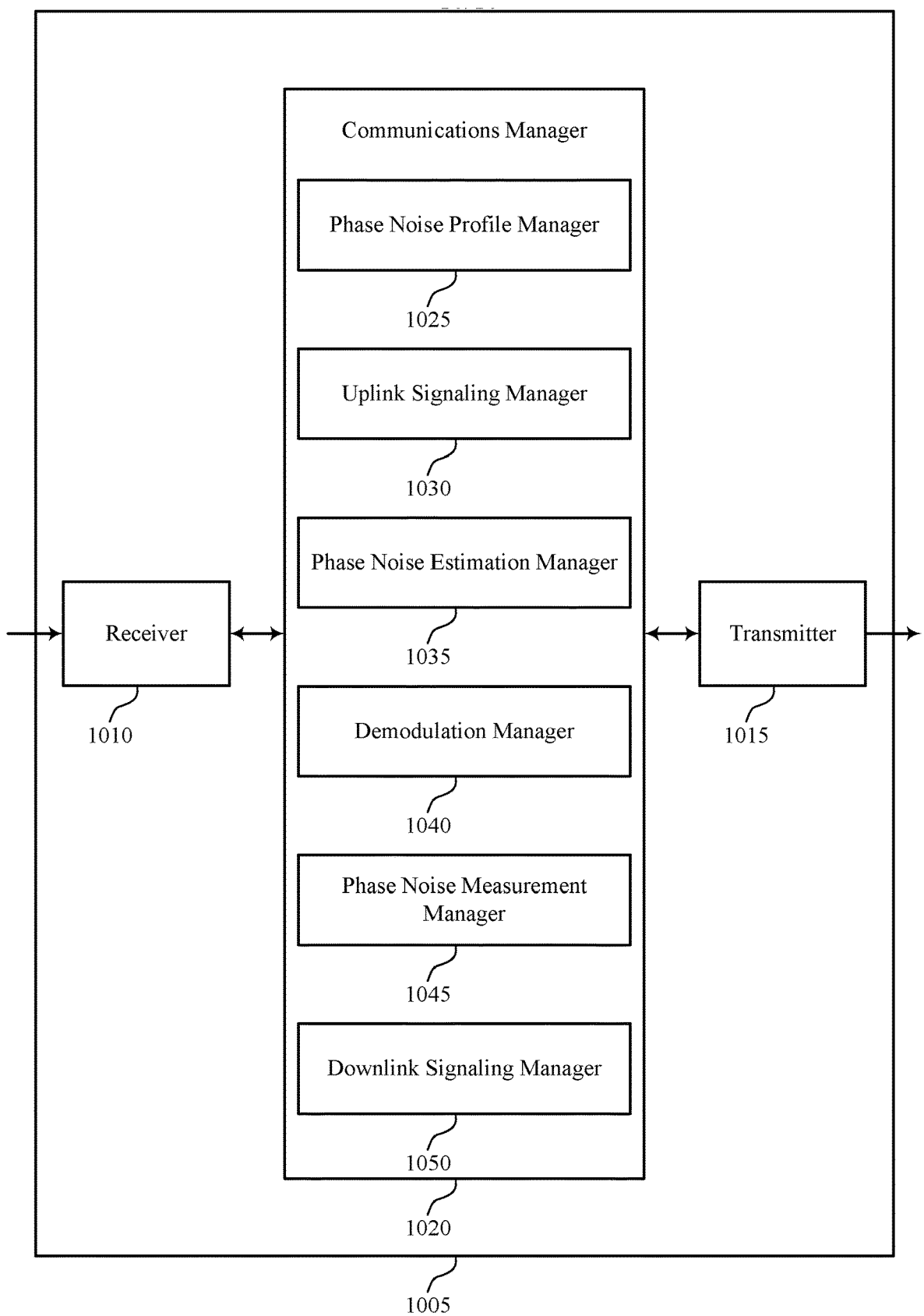

FIG. 10 shows a block diagram of a device 1005 that supports phase noise profile signaling for a single carrier waveform in accordance with aspects of the present disclosure. The device 1005 may be an example of aspects of a device 905 or a base station 105 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to phase noise profile signaling for a single carrier waveform). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to phase noise profile signaling for a single carrier waveform). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of phase noise profile signaling for a single carrier waveform as described herein. For example, the communications manager 1020 may include a phase noise profile manager 1025, an uplink signaling manager 1030, a phase noise estimation manager 1035, a demodulation manager 1040, a phase noise measurement manager 1045, a downlink signaling manager 1050, or any combination thereof. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The phase noise profile manager 1025 may be configured as or otherwise support a means for receiving, from a UE, an indication of a phase noise profile for the UE associated with a single carrier, the phase noise profile including one or more phase noise statistical values. The uplink signaling manager 1030 may be configured as or otherwise support a means for receiving, from the UE, one or more uplink messages and one or more phase tracking reference signals based on the phase noise profile. The phase noise estimation manager 1035 may be configured as or otherwise support a means for estimating one or more phase noise values based on the one or more phase tracking reference signals and the one or more phase noise statistical values of the phase noise profile. The demodulation manager 1040 may be configured as or otherwise support a means for demodulating the one or more uplink messages based on the one or more phase noise values.

Additionally, or alternatively, the communications manager 1020 may support wireless communications at a base station in accordance with examples as disclosed herein. The phase noise measurement manager 1045 may be configured as or otherwise support a means for performing, by the base station, one or more phase noise measurements associated with a single carrier for the base station. The phase noise profile manager 1025 may be configured as or otherwise support a means for transmitting, to a UE, one or more phase noise statistical values based at least in part on the one or more phase noise measurements. The downlink signaling manager 1050 may be configured as or otherwise support a means for transmitting, to the UE, one or more downlink messages and one or more phase tracking reference signals based on the one or more phase noise statistical values.

Figure 11:
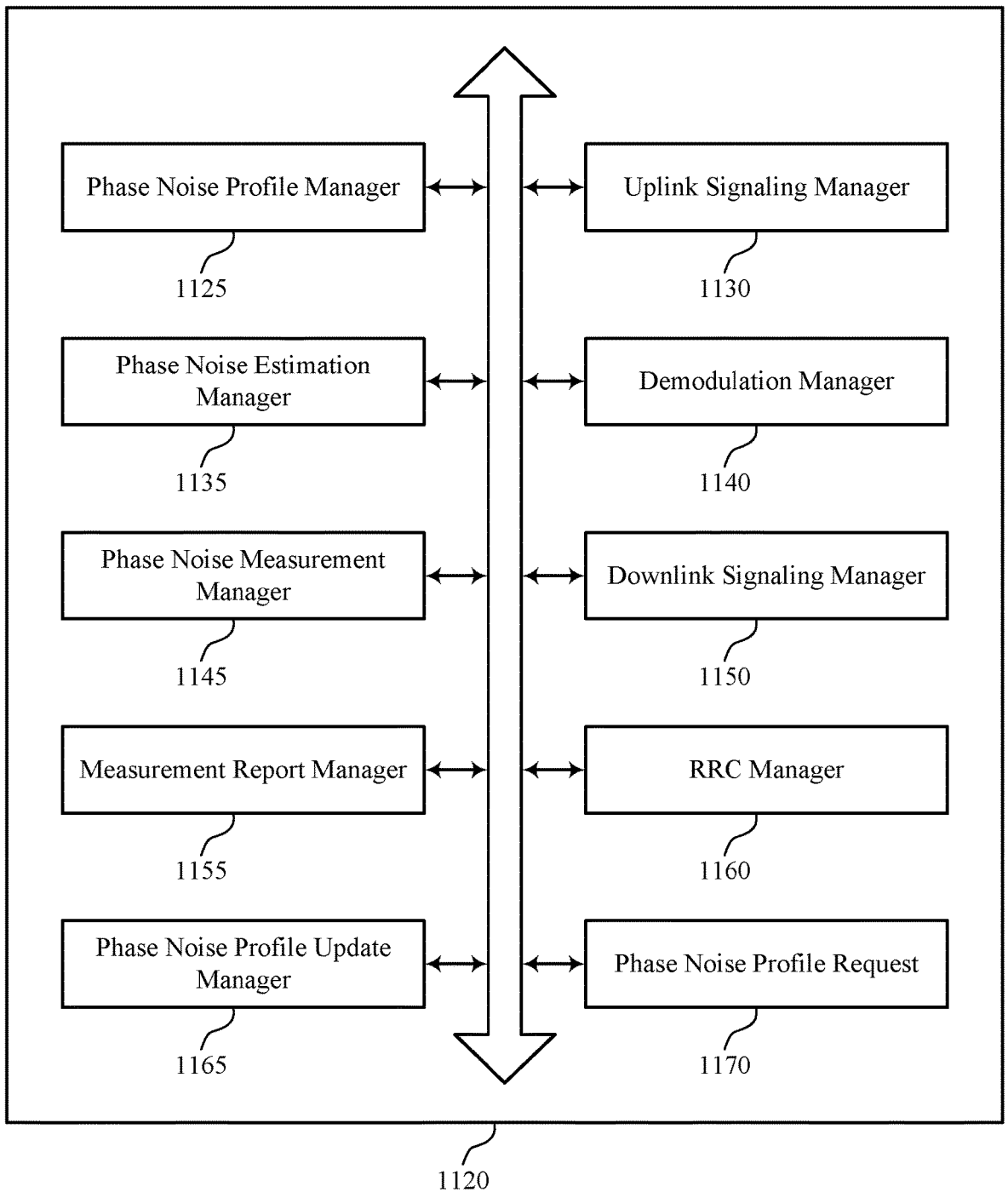
FIG. 11 shows a block diagram of a communications manager that supports phase noise profile signaling for a single carrier waveform in accordance with aspects of the present disclosure.

FIG. 11 shows a block diagram of a communications manager 1120 that supports phase noise profile signaling for a single carrier waveform in accordance with aspects of the present disclosure. The communications manager 1120, or various components thereof, may be an example of means for performing various aspects of phase noise profile signaling for a single carrier waveform as described herein. For example, the communications manager 1120 may include a phase noise profile manager 1125, an uplink signaling manager 1130, a phase noise estimation manager 1135, a demodulation manager 1140, a phase noise measurement manager 1145, a downlink signaling manager 1150, a measurement report manager 1155, an RRC manager 1160, a phase noise profile update manager 1165, a phase noise profile request 1170, or any combination thereof. Each of these components may communicate, directly or indirectly, with one another (for example, via one or more buses).

The communications manager 1120 may support wireless communications at a base station in accordance with examples as disclosed herein. The phase noise profile manager 1125 may be configured as or otherwise support a means for receiving, from a UE, one or more phase noise statistical values for the UE associated with a single carrier. The uplink signaling manager 1130 may be configured as or otherwise support a means for receiving, from the UE, one or more uplink messages and one or more phase tracking reference signals based on the one or more phase noise statistical values. The phase noise estimation manager 1135 may be configured as or otherwise support a means for estimating one or more phase noise values based on the one or more phase tracking reference signals and the one or more phase noise statistical values. The demodulation manager 1140 may be configured as or otherwise support a means for demodulating the one or more uplink messages based on the one or more phase noise values.

In some examples, to support receiving the indication of the phase noise profile, the measurement report manager 1155 may be configured as or otherwise support a means for receiving the one or more phase noise statistical values in a measurement report.

In some examples, to support receiving the one or more phase noise statistical values, the RRC manager 1160 may be configured as or otherwise support a means for receiving the one or more phase noise statistical values in a radio resource control message.

In some examples, the phase noise measurement manager 1145 may be configured as or otherwise support a means for performing, by the base station, one or more phase noise measurements associated with the single carrier, where estimating the one or more phase noise values is based on one or more phase noise statistical values for the base station, and where the one or more phase noise statistical values for the base station are based at least in part on performing the one or more phase noise measurements.

In some examples, the phase noise profile update manager 1165 may be configured as or otherwise support a means for receiving, from the UE, an indication of an updated phase noise profile based on receiving the indication of the phase noise profile.

In some examples, to support receiving the indication of the updated one or more phase noise statistical values, the phase noise profile update manager 1165 may be configured as or otherwise support a means for receiving a set of updated phase noise statistical values associated with a respective set of offsets from a center frequency of the single carrier on frequency resources associated with one offset of the set of offsets.

In some examples, the phase noise profile update manager 1165 may be configured as or otherwise support a means for receiving a first updated phase noise statistical value associated with a first offset from a center frequency of the single carrier on frequency resources associated with the first offset. In some examples, the phase noise profile update manager 1165 may be configured as or otherwise support a means for receiving a second updated phase noise statistical value associated with a second offset from the center frequency of the single carrier on frequency resources associated with the second offset.

In some examples, the phase noise profile update manager 1165 may be configured as or otherwise support a means for transmitting, to the UE, an indication of a threshold frequency and an indication not to indicate updated phase noise statistical values associated with one or more offsets from a center frequency of the single carrier that satisfy the threshold frequency.

Additionally, or alternatively, the communications manager 1120 may support wireless communications at a base station in accordance with examples as disclosed herein. The phase noise measurement manager 1145 may be configured as or otherwise support a means for performing, by the base station, one or more phase noise measurements associated with a single carrier for the base station. In some examples, the phase noise profile manager 1125 may be configured as or otherwise support a means for transmitting, to a UE, one or more phase noise statistical values based at least in part on the one or more phase noise measurements. The downlink signaling manager 1150 may be configured as or otherwise support a means for transmitting, to the UE, one or more downlink messages and one or more phase tracking reference signals based on the phase noise profile.

In some examples, to support transmitting the indication of the phase noise profile, the phase noise profile manager 1125 may be configured as or otherwise support a means for broadcasting the indication of the phase noise profile to a set of multiple UEs including the UE.

In some examples, the phase noise profile request 1170 may be configured as or otherwise support a means for receiving, from the UE, a request for the phase noise profile, where transmitting the indication of the phase noise profile is based on receiving the request, and where transmitting the indication of the phase noise profile includes transmitting a radio resource control message.

In some examples, the phase noise profile update manager 1165 may be configured as or otherwise support a means for updating one or more of the phase noise statistical values based at least in part on a triggering event. In some examples, the phase noise profile update manager 1165 may be configured as or otherwise support a means for transmitting, to the UE, an indication of the one or more updated phase noise statistical values based at least in part on detecting the triggering event and transmitting the one or more phase noise statistical values.

In some examples, the triggering event may be a change in temperature, a change in voltage, a change in transmit power, a change in an operating band, or any combination thereof.

In some examples, to support transmitting the indication of the updated one or more phase noise statistical values, the phase noise profile update manager 1165 may be configured as or otherwise support a means for transmitting a set of updated phase noise statistical values associated with a respective set of offsets from a center frequency of the single carrier on frequency resources associated with one offset of the set of offsets.

In some examples, to support transmitting the indication of the updated one or more phase noise statistical values, the phase noise profile update manager 1165 may be configured as or otherwise support a means for transmitting a first updated phase noise statistical value associated with a first offset from a center frequency of the single carrier on frequency resources associated with the first offset. In some examples, to support transmitting the indication of the updated one or more phase noise statistical values, the phase noise profile update manager 1165 may be configured as or otherwise support a means for transmitting a second updated phase noise statistical value associated with a second offset from the center frequency of the single carrier on frequency resources associated with the second offset.

Figure 12:
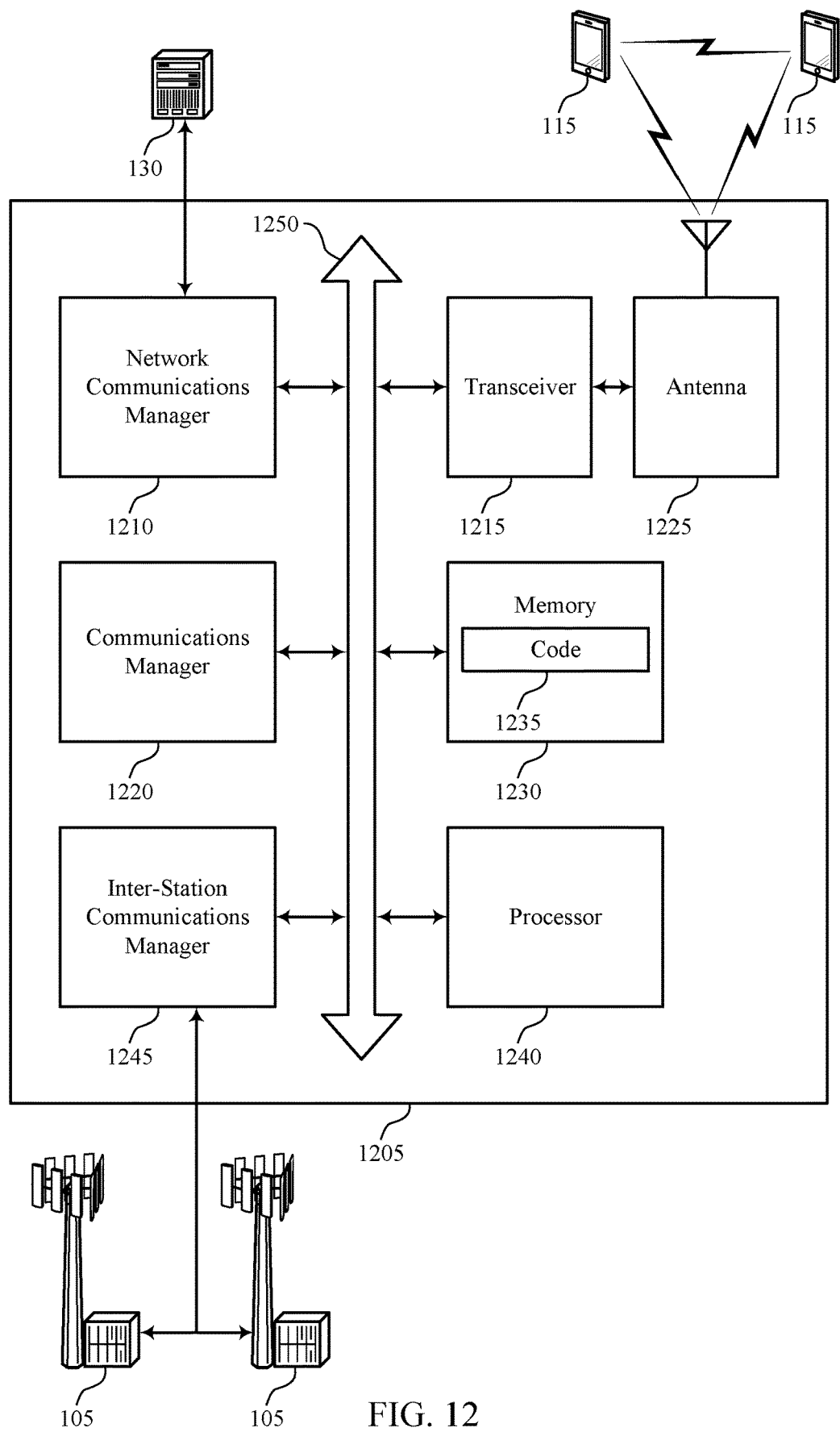
FIG. 12 shows a diagram of a system including a device that supports phase noise profile signaling for a single carrier waveform in accordance with aspects of the present disclosure.

FIG. 12 shows a diagram of a system including a device 1205 that supports phase noise profile signaling for a single carrier waveform in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (for example, operatively, communicatively, functionally, electronically, electrically) via one or more buses (for example, a bus 1250).

The network communications manager 1210 may manage communications with a core network 130 (for example, via one or more wired backhaul links). For example, the network communications manager 1210 may manage the transfer of data communications for client devices, such as one or more UEs 115.

In some cases, the device 1205 may include a single antenna 1225. However, in some other examples the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some examples, the code 1235 may not be directly executable by the processor 1240 but may cause a computer (for example, when compiled and executed) to perform functions described herein. In some examples, the memory 1230 may contain, among other things, a BIOS which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some other examples, a memory controller may be integrated into the processor 1240. The processor 1240 may be configured to execute computer-readable instructions stored in a memory (for example, the memory 1230) to cause the device 1205 to perform various functions (for example, functions or tasks supporting phase noise profile signaling for a single carrier waveform). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, one or more phase noise statistical values for the UE associated with a single carrier. The communications manager 1220 may be configured as or otherwise support a means for receiving, from the UE, one or more uplink messages and one or more phase tracking reference signals based on the one or more phase noise statistical values. The communications manager 1220 may be configured as or otherwise support a means for estimating one or more phase noise values based on the one or more phase tracking reference signals and the one or more phase noise statistical values. The communications manager 1220 may be configured as or otherwise support a means for demodulating the one or more uplink messages based on the one or more phase noise values.

Additionally, or alternatively, the communications manager 1220 may support wireless communications at a base station in accordance with examples as disclosed herein. For example, the communications manager 1220 may be configured as or otherwise support a means for performing, by the base station, one or more phase noise measurements associated with a single carrier for the base station. The communications manager 1220 may be configured as or otherwise support a means for transmitting, to a UE, one or more phase noise statistical values based at least in part on the one or more phase noise measurements. The communications manager 1220 may be configured as or otherwise support a means for transmitting, to the UE, one or more downlink messages and one or more phase tracking reference signals based on the one or more phase noise statistical values.

By including or configuring the communications manager 1220 in accordance with examples as described herein, the device 1205 may support techniques for improved phase noise estimation based on signaling of phase noise statistical values between transmitting and receiving devices. Described techniques may result in improved throughput, decreased negative impact of phase noise errors, improved reliability of wireless communications, and decreased system latency, among other advantages.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of phase noise profile signaling for a single carrier waveform as described herein, or the processor 1240 and the memory 1230 may be otherwise configured to perform or support such operations.

Figure 13:
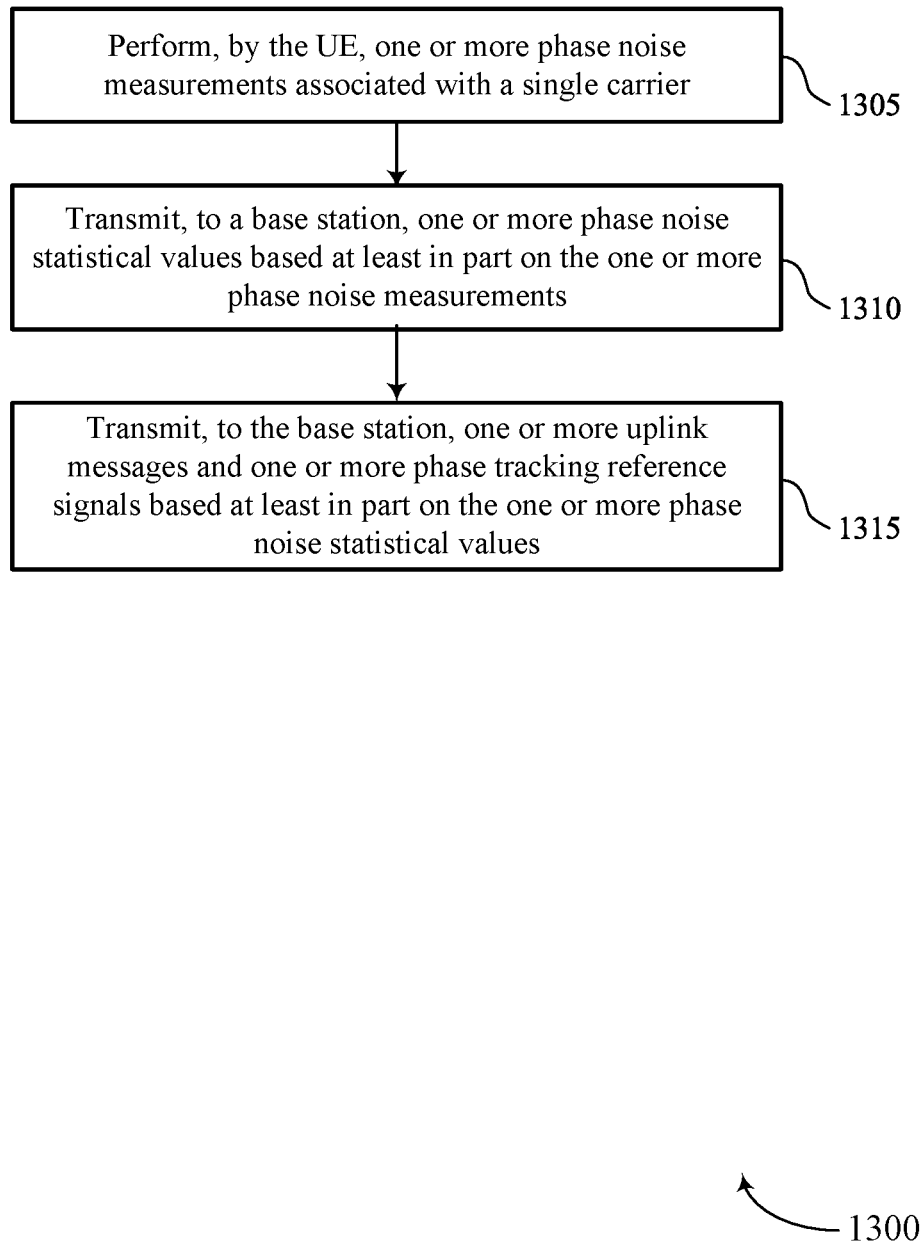
FIGS. 13 through 16 show flowcharts illustrating methods that support phase noise profile signaling for a single carrier waveform in accordance with aspects of the present disclosure.

FIG. 13 shows a flowchart illustrating a method 1300 that supports phase noise profile signaling for a single carrier waveform in accordance with aspects of the present disclosure. The operations of the method 1300 may be implemented by a UE or its components as described herein. For example, the operations of the method 1300 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1305, the method may include performing, by the UE, one or more phase noise measurements associated with a single carrier. The operations of 1305 may be performed in accordance with examples as disclosed herein. In some examples, aspects of the operations of 1305 may be performed by a phase noise measurement manager 725 as described with reference to FIG. 7.

At 1310, the method may include transmitting, to a base station, one or more phase noise statistical values based at least in part on the one or more phase noise measurements. The operations of 1310 may be performed in accordance with examples as disclosed herein. In some examples, aspects of the operations of 1310 may be performed by a phase noise profile manager 730 as described with reference to FIG. 7.

At 1315, the method may include transmitting, to the base station, one or more uplink messages and one or more phase tracking reference signals based on the one or more phase noise statistical values. The operations of 1315 may be performed in accordance with examples as disclosed herein. In some examples, aspects of the operations of 1315 may be performed by an uplink transmission manager 735 as described with reference to FIG. 7.

Figure 14:
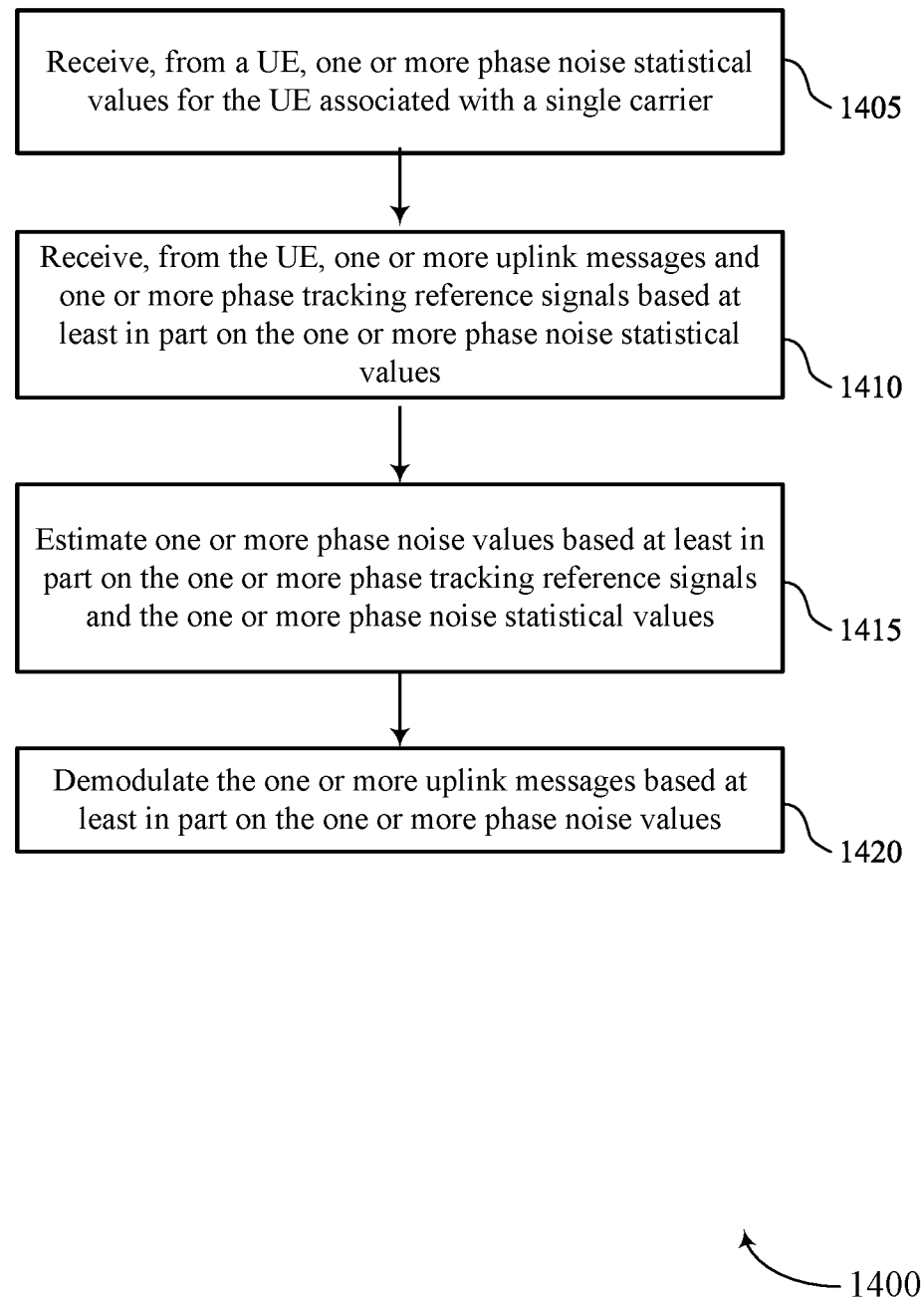

FIG. 14 shows a flowchart illustrating a method 1400 that supports phase noise profile signaling for a single carrier waveform in accordance with aspects of the present disclosure. The operations of the method 1400 may be implemented by a base station or its components as described herein. For example, the operations of the method 1400 may be performed by a base station 105 as described with reference to FIGS. 1-4 and 9-12. In some examples, a base station may execute a set of instructions to control the functional elements of the base station to perform the described functions. Additionally, or alternatively, the base station may perform aspects of the described functions using special-purpose hardware.

At 1405, the method may include receiving, from a UE, one or more phase noise statistical values for the UE associated with a single carrier. The operations of 1405 may be performed in accordance with examples as disclosed herein. In some examples, aspects of the operations of 1405 may be performed by a phase noise profile manager 1125 as described with reference to FIG. 11.

At 1410, the method may include receiving, from the UE, one or more uplink messages and one or more phase tracking reference signals based at least in part on the one or more phase noise statistical values. The operations of 1410 may be performed in accordance with examples as disclosed herein. In some examples, aspects of the operations of 1410 may be performed by an uplink signaling manager 1130 as described with reference to FIG. 11.

At 1415, the method may include estimating one or more phase noise values based at least in part on the one or more phase tracking reference signals and the one or more phase noise statistical values. The operations of 1415 may be performed in accordance with examples as disclosed herein. In some examples, aspects of the operations of 1415 may be performed by a phase noise estimation manager 1135 as described with reference to FIG. 11.

At 1420, the method may include demodulating the one or more uplink messages based at least in part on the one or more phase noise values. The operations of 1420 may be performed in accordance with examples as disclosed herein. In some examples, aspects of the operations of 1420 may be performed by a demodulation manager 1140 as described with reference to FIG. 11.

Figure 15:
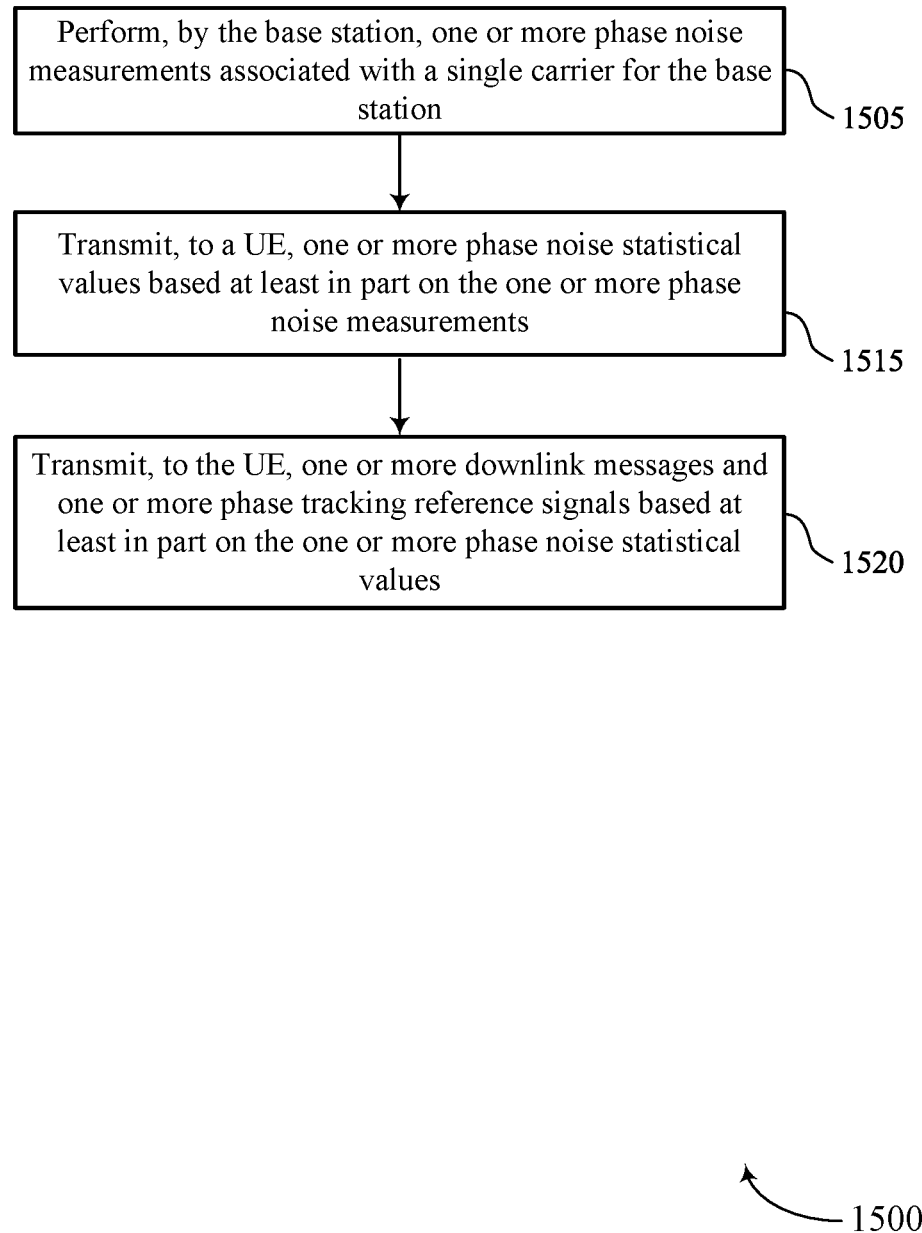

FIG. 15 shows a flowchart illustrating a method 1500 that supports phase noise profile signaling for a single carrier waveform in accordance with aspects of the present disclosure. The operations of the method 1500 may be implemented by a base station or its components as described herein. For example, the operations of the method 1500 may be performed by a base station 105 as described with reference to FIGS. 1-4 and 9-12. In some examples, a base station may execute a set of instructions to control the functional elements of the base station to perform the described functions. Additionally, or alternatively, the base station may perform aspects of the described functions using special-purpose hardware.

At 1505, the method may include performing, by the base station, one or more phase noise measurements associated with a single carrier for the base station. The operations of 1505 may be performed in accordance with examples as disclosed herein. In some examples, aspects of the operations of 1505 may be performed by a phase noise measurement manager 1145 as described with reference to FIG. 11.

At 1515, the method may include transmitting, to a UE, one or more phase noise statistical values based at least in part on the one or more phase noise measurements. The operations of 1515 may be performed in accordance with examples as disclosed herein. In some examples, aspects of the operations of 1515 may be performed by a phase noise profile manager 1125 as described with reference to FIG. 11.

At 1520, the method may include transmitting, to the UE, one or more downlink messages and one or more phase tracking reference signals based on the one or more phase noise statistical values. The operations of 1520 may be performed in accordance with examples as disclosed herein. In some examples, aspects of the operations of 1520 may be performed by a downlink signaling manager 1150 as described with reference to FIG. 11.

Figure 16:
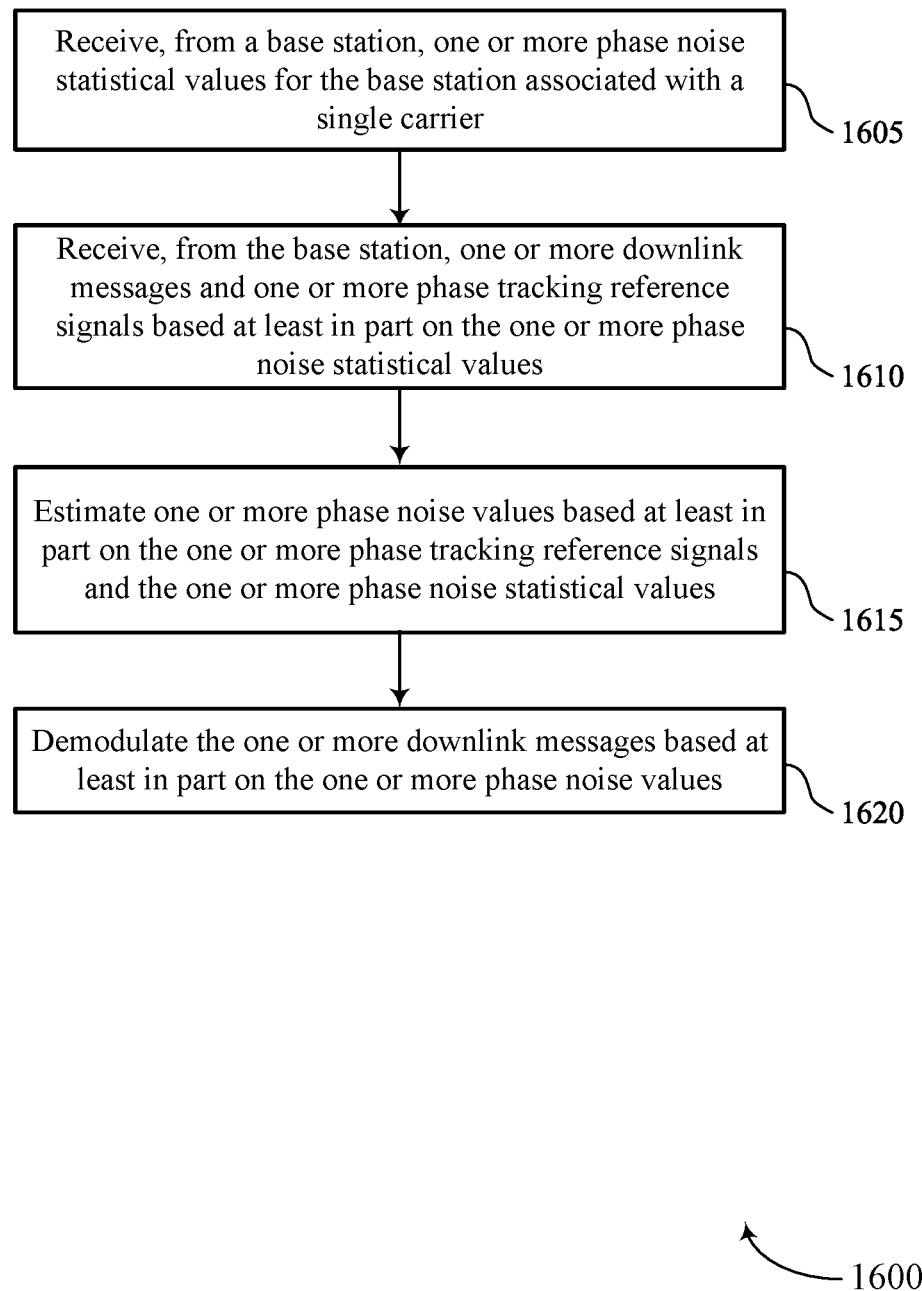

FIG. 16 shows a flowchart illustrating a method 1600 that supports phase noise profile signaling for a single carrier waveform in accordance with aspects of the present disclosure. The operations of the method 1600 may be implemented by a UE or its components as described herein. For example, the operations of the method 1600 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, one or more phase noise statistical values for the base station associated with a single carrier. The operations of 1605 may be performed in accordance with examples as disclosed herein. In some examples, aspects of the operations of 1605 may be performed by a phase noise profile manager 730 as described with reference to FIG. 7.

At 1610, the method may include receiving, from the base station, one or more downlink messages and one or more phase tracking reference signals based at least in part on the one or more phase noise statistical values. The operations of 1610 may be performed in accordance with examples as disclosed herein. In some examples, aspects of the operations of 1610 may be performed by a downlink signaling manager 740 as described with reference to FIG. 7.

At 1615, the method may include estimating one or more phase noise values based at least in part on the one or more phase tracking reference signals and the one or more phase noise statistical values. The operations of 1615 may be performed in accordance with examples as disclosed herein. In some examples, aspects of the operations of 1615 may be performed by a phase noise estimation manager 745 as described with reference to FIG. 7.

At 1620, the method may include demodulating the one or more downlink messages based at least in part on the one or more phase noise values. The operations of 1620 may be performed in accordance with examples as disclosed herein. In some examples, aspects of the operations of 1620 may be performed by a demodulation manager 750 as described with reference to FIG. 7.

The following provides an overview of aspects of the present disclosure:

Aspect 1: A method for wireless communications at a UE, comprising: performing, by the UE, one or more phase noise measurements associated with a single carrier; transmitting, to a base station, one or more phase noise statistical values based at least in part on the one or more phase noise measurements; and transmitting, to the base station, one or more uplink messages and one or more phase tracking reference signals based at least in part on the one or more phase noise statistical values.

Aspect 2: The method of aspect 1, further comprising transmitting the one or more phase noise statistical values in a measurement report, a radio resource control message, or any combination thereof.

Aspect 3: The method of any of aspects 1 through 2, further comprising: determining, based at least in part on the one or more phase noise measurements, a phase noise profile comprising the one or more phase noise statistical values.

Aspect 4: The method of any of aspects 1 through 3, wherein the one or more phase noise statistical values comprise a set of phase variation values, each phase variation value being associated with a respective offset from a center frequency of the single carrier.

Aspect 5: The method of any of aspects 1 through 4, further comprising: updating one or more of the phase noise statistical values based at least in part on a triggering event; and transmitting, to the base station, an indication of the one or more updated phase noise statistical values based at least in part on detecting the triggering event and transmitting the one or more phase noise statistical values.

Aspect 6: The method of aspect 5, wherein the triggering event comprises a change in temperature, a change in voltage, a change in transmit power, a change in an operating band, or any combination thereof.

Aspect 7: The method of any of aspects 5 through 6, wherein transmitting the indication of the one or more updated phase noise statistical values comprises transmitting a set of updated phase noise statistical values associated with a respective set of offsets from a center frequency of the single carrier on frequency resources associated with one offset of the set of offsets.

Aspect 8: The method of any of aspects 5 through 7, wherein transmitting the indication of the one or more updated phase noise statistical values comprises: transmitting a first updated phase noise statistical value associated with a first offset from a center frequency of the single carrier on frequency resources associated with the first offset; and transmitting a second updated phase noise statistical value associated with a second offset from the center frequency of the single carrier on frequency resources associated with the second offset.

Aspect 9: The method of any of aspects 5 through 8, further comprising: receiving, from the base station, an indication of a threshold frequency and an indication not to indicate updated phase noise statistical values associated with one or more offsets from a center frequency of the single carrier that satisfy the threshold frequency; and refraining from transmitting an indication of updated phase noise statistical values associated with the one or more offsets from the center frequency of the single carrier that satisfy the threshold frequency.

Aspect 10: A method for wireless communications at a base station, comprising: receiving, from a UE, one or more phase noise statistical values for the UE associated with a single carrier; receiving, from the UE, one or more uplink messages and one or more phase tracking reference signals based at least in part on the one or more phase noise statistical values; estimating one or more phase noise values based at least in part on the one or more phase tracking reference signals and the one or more phase noise statistical values; and demodulating the one or more uplink messages based at least in part on the one or more phase noise values.

Aspect 11: The method of aspect 10, wherein receiving the one or more phase noise statistical values comprises receiving the one or more phase noise statistical values in a measurement report, a radio resource control message, or any combination thereof.

Aspect 12: The method of any of aspects 10 through 11, further comprising: performing, by the base station, one or more phase noise measurements associated with the single carrier wherein estimating the one or more phase noise values is based at least in part on one or more phase noise statistical values for the base station based at least in part on performing the one or more phase noise measurements.

Aspect 13: The method of any of aspects 10 through 12, further comprising receiving, from the UE, an indication of one or more updated phase noise statistical values based at least in part on receiving the one or more phase noise statistical values.

Aspect 14: The method of aspect 13, wherein receiving the indication of the updated one or more phase noise statistical values comprises receiving a set of updated phase noise statistical values associated with a respective set of offsets from a center frequency of the single carrier on frequency resources associated with one offset of the set of offsets.

Aspect 15: The method of any of aspects 13 through 14, wherein receiving the indication of the updated one or more phase noise statistical values comprises: receiving a first updated phase noise statistical value associated with a first offset from a center frequency of the single carrier on frequency resources associated with the first offset; and receiving a second updated phase noise statistical value associated with a second offset from the center frequency of the single carrier on frequency resources associated with the second offset.

Aspect 16: The method of any of aspects 13 through 15, further comprising transmitting, to the UE, an indication of a threshold frequency and an indication not to indicate updated phase noise statistical values associated with one or more offsets from a center frequency of the single carrier that satisfy the threshold frequency.

Aspect 17: A method for wireless communications at a base station, comprising: performing, by the base station, one or more phase noise measurements associated with a single carrier; transmitting, to a UE, one or more phase noise statistical values based at least in part on the one or more phase noise measurements; and transmitting, to the UE, one or more downlink messages and one or more phase tracking reference signals based at least in part on the one or more phase noise statistical values.

Aspect 18: The method of aspect 17, wherein transmitting the one or more phase noise statistical values comprises broadcasting the one or more phase noise statistical values to a plurality of UEs comprising the UE.

Aspect 19: The method of any of aspects 17 through 18, further comprising receiving, from the UE, a request for the one or more phase noise statistical values, wherein transmitting the one or more phase noise statistical values is based at least in part on receiving the request, and transmitting the one or more phase noise statistical values comprises transmitting a radio resource control message.

Aspect 20: The method of any of aspects 17 through 19, further comprising: updating one or more of the phase noise statistical values based at least in part on a triggering event; and transmitting, to the UE, an indication of an updated one or more phase noise statistical values based at least in part on detecting the triggering event and transmitting the indication of the phase noise profile.

Aspect 21: The method of aspect 20, wherein the triggering event comprises a change in temperature, a change in voltage, a change in transmit power, a change in an operating band, or any combination thereof.

Aspect 22: The method of any of aspects 20 through 21, wherein transmitting the indication of the one or more updated phase noise statistical values comprises transmitting a set of updated phase noise statistical values associated with a respective set of offsets from a center frequency of the single carrier on frequency resources associated with one offset of the set of offsets.

Aspect 23: The method of any of aspects 20 through 22, wherein transmitting the indication of the one or more updated phase noise statistical values comprises: transmitting a first updated phase noise statistical value associated with a first offset from a center frequency of the single carrier on frequency resources associated with the first offset; and transmitting a second updated phase noise statistical value associated with a second offset from the center frequency of the single carrier on frequency resources associated with the second offset.

Aspect 24: The method of any of aspects 17 through 23, further comprising: determining, based at least in part on the one or more phase noise measurements, a phase noise profile comprising the one or more phase noise statistical values.

Aspect 25: A method for wireless communications at a UE, comprising: receiving, from a base station, one or more phase noise statistical values for the base station associated with a single carrier; receiving, from the base station, one or more downlink messages and one or more phase tracking reference signals based at least in part on the one or more phase noise statistical values; estimating one or more phase noise values based at least in part on the one or more phase tracking reference signals and the one or more phase noise statistical values; and demodulating the one or more downlink messages based at least in part on the one or more phase noise values.

Aspect 26: The method of aspect 25, wherein receiving the one or more phase noise statistical values comprises receiving a broadcast message comprising the one or more phase noise statistical values.

Aspect 27: The method of any of aspects 25 through 26, further comprising transmitting, to the base station, a request for the one or more phase noise statistical values, wherein receiving the one or more phase noise statistical values is based at least in part on transmitting the request, and receiving the one or more phase noise statistical values comprises receiving a radio resource control message.

Aspect 28: The method of any of aspects 25 through 27, further comprising receiving, from the base station, an indication of one or more updated phase noise statistical values based at least in part on receiving the phase noise statistical values.

Aspect 29: The method of aspect 28, wherein receiving the indication of the one or more updated phase noise statistical values comprises receiving a set of updated phase noise statistical values associated with a respective set of offsets from a center frequency of the single carrier on frequency resources associated with one offset of the set of offsets.

Aspect 30: The method of any of aspects 28 through 29, wherein receiving the indication of the one or more updated phase noise statistical values comprises: receiving a first updated phase noise statistical value associated with a first offset from a center frequency of the single carrier on frequency resources associated with the first offset; and receiving a second updated phase noise statistical value associated with a second offset from the center frequency of the single carrier on frequency resources associated with the second offset.

Aspect 31: An apparatus for wireless communications at a UE, comprising a processor; memory coupled with the processor; and instructions stored in the memory and executable by the processor to cause the apparatus to perform a method of any of aspects 1 through 9.

Aspect 32: An apparatus for wireless communications at a UE, comprising at least one means for performing a method of any of aspects 1 through 9.

Aspect 33: A non-transitory computer-readable medium storing code for wireless communications at a UE, the code comprising instructions executable by a processor to perform a method of any of aspects 1 through 9.

Aspect 34: An apparatus for wireless communications at a base station, comprising a processor; memory coupled with the processor; and instructions stored in the memory and executable by the processor to cause the apparatus to perform a method of any of aspects 10 through 16.

Aspect 35: An apparatus for wireless communications at a base station, comprising at least one means for performing a method of any of aspects 10 through 16.

Aspect 36: A non-transitory computer-readable medium storing code for wireless communications at a base station, the code comprising instructions executable by a processor to perform a method of any of aspects 10 through 16.

Aspect 37: An apparatus for wireless communications at a base station, comprising a processor; memory coupled with the processor; and instructions stored in the memory and executable by the processor to cause the apparatus to perform a method of any of aspects 17 through 24.

Aspect 38: An apparatus for wireless communications at a base station, comprising at least one means for performing a method of any of aspects 17 through 24.

Aspect 39: A non-transitory computer-readable medium storing code for wireless communications at a base station, the code comprising instructions executable by a processor to perform a method of any of aspects 17 through 24.

Aspect 40: An apparatus for wireless communications at a UE, comprising a processor; memory coupled with the processor; and instructions stored in the memory and executable by the processor to cause the apparatus to perform a method of any of aspects 25 through 30.

Aspect 41: An apparatus for wireless communications at a UE, comprising at least one means for performing a method of any of aspects 25 through 30.

Aspect 42: A non-transitory computer-readable medium storing code for wireless communications at a UE, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining, among other examples. Also, "determining" can include receiving (such as receiving information), accessing (such as accessing data in a memory) among other examples. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
performing, by the UE, one or more phase noise measurements associated with a single carrier;
transmitting, to a base station, one or more phase noise statistical values in accordance with the one or more phase noise measurements;
transmitting, to the base station, one or more uplink messages and one or more phase tracking reference signals in accordance with the one or more phase noise statistical values;
updating one or more of the phase noise statistical values in accordance with a triggering event; and
transmitting, to the base station, an indication of the one or more updated phase noise statistical values in accordance with detecting the triggering event and transmitting the one or more phase noise statistical values.

2. The method of claim 1, further comprising transmitting the one or more phase noise statistical values in a measurement report, a radio resource control message, or any combination thereof.

3. The method of claim 1, further comprising:
determining, in accordance with the one or more phase noise measurements, a phase noise profile comprising the one or more phase noise statistical values.

4. The method of claim 1, wherein the one or more phase noise statistical values comprise a set of phase variation values, each phase variation value being associated with a respective offset from a center frequency of the single carrier.

5. The method of claim 1, wherein the triggering event comprises a change in temperature, a change in voltage, a change in transmit power, a change in an operating band, or any combination thereof.

6. The method of claim 1, wherein transmitting the indication of the one or more updated phase noise statistical values comprises transmitting a set of updated phase noise statistical values associated with a respective set of offsets from a center frequency of the single carrier on frequency resources associated with one offset of the set of offsets.

7. The method of claim 1, wherein transmitting the indication of the one or more updated phase noise statistical values comprises:
transmitting a first updated phase noise statistical value associated with a first offset from a center frequency of the single carrier on frequency resources associated with the first offset; and
transmitting a second updated phase noise statistical value associated with a second offset from the center frequency of the single carrier on frequency resources associated with the second offset.

8. The method of claim 1, further comprising:
receiving, from the base station, an indication of a threshold frequency and an indication not to indicate updated phase noise statistical values associated with one or more offsets from a center frequency of the single carrier that satisfy the threshold frequency; and
refraining from transmitting an indication of updated phase noise statistical values associated with the one or more offsets from the center frequency of the single carrier that satisfy the threshold frequency.

9. A method for wireless communications at a base station, comprising:
receiving, from a user equipment (UE), one or more phase noise statistical values for the UE associated with a single carrier;
receiving, from the UE, one or more uplink messages and one or more phase tracking reference signals in accordance with the one or more phase noise statistical values;
estimating one or more phase noise values in accordance with the one or more phase tracking reference signals and the one or more phase noise statistical values;
receiving, from the UE, an indication of one or more updated phase noise statistical values in accordance with receiving the one or more phase noise statistical values; and
demodulating the one or more uplink messages in accordance with the one or more phase noise values.

10. The method of claim 9, wherein receiving the one or more phase noise statistical values comprises receiving the one or more phase noise statistical values in a measurement report, a radio resource control message, or any combination thereof.

11. The method of claim 9, further comprising:
performing, by the base station, one or more phase noise measurements associated with the single carrier, wherein estimating the one or more phase noise values is associated with one or more phase noise statistical values for the base station in accordance with performing the one or more phase noise measurements.

12. The method of claim 9, wherein receiving the indication of the updated one or more phase noise statistical values comprises receiving a set of updated phase noise statistical values associated with a respective set of offsets from a center frequency of the single carrier on frequency resources associated with one offset of the set of offsets.

13. The method of claim 9, wherein receiving the indication of the updated one or more phase noise statistical values comprises:
receiving a first updated phase noise statistical value associated with a first offset from a center frequency of the single carrier on frequency resources associated with the first offset; and
receiving a second updated phase noise statistical value associated with a second offset from the center frequency of the single carrier on frequency resources associated with the second offset.

14. The method of claim 9, further comprising transmitting, to the UE, an indication of a threshold frequency and an indication not to indicate updated phase noise statistical values associated with one or more offsets from a center frequency of the single carrier that satisfy the threshold frequency.

15. A method for wireless communications at a base station, comprising:
performing, by the base station, one or more phase noise measurements associated with a single carrier;
transmitting, to a user equipment (UE), one or more phase noise statistical values in accordance with the one or more phase noise measurements;

transmitting, to the UE, one or more downlink messages and one or more phase tracking reference signals in accordance with the one or more phase noise statistical values;

updating one or more of the phase noise statistical values in accordance with a triggering event; and transmitting, to the UE, an indication of an updated one or more phase noise statistical values in accordance with detecting the triggering event and transmitting the indication of the phase noise profile.

16. The method of claim 15, wherein transmitting the one or more phase noise statistical values comprises broadcasting the one or more phase noise statistical values to a plurality of UEs comprising the UE.

17. The method of claim 15, further comprising receiving, from the UE, a request for the one or more phase noise statistical values, wherein transmitting the one or more phase noise statistical values is in accordance with receiving the request, and wherein transmitting the one or more phase noise statistical values comprises transmitting a radio resource control message.

18. The method of claim 15, wherein the triggering event comprises a change in temperature, a change in voltage, a change in transmit power, a change in an operating band, or any combination thereof.

19. The method of claim 15, wherein transmitting the indication of the one or more updated phase noise statistical values comprises transmitting a set of updated phase noise statistical values associated with a respective set of offsets from a center frequency of the single carrier on frequency resources associated with one offset of the set of offsets.

20. The method of claim 15, wherein transmitting the indication of the one or more updated phase noise statistical values comprises:

transmitting a first updated phase noise statistical value associated with a first offset from a center frequency of the single carrier on frequency resources associated with the first offset; and transmitting a second updated phase noise statistical value associated with a second offset from the center frequency of the single carrier on frequency resources associated with the second offset.

21. The method of claim 15, further comprising:

determining, in accordance with the one or more phase noise measurements, a phase noise profile comprising the one or more phase noise statistical values.

22. A method for wireless communications at a user equipment (UE), comprising:

receiving, from a base station, one or more phase noise statistical values for the base station associated with a single carrier;

receiving, from the base station, one or more downlink messages and one or more phase tracking reference signals in accordance with the one or more phase noise statistical values;

estimating one or more phase noise values in accordance with the one or more phase tracking reference signals and the one or more phase noise statistical values;

receiving, from the base station, an indication of one or more updated phase noise statistical values in accordance with receiving the phase noise statistical values; and demodulating the one or more downlink messages in accordance with the one or more phase noise values.

23. The method of claim 22, wherein receiving the one or more phase noise statistical values comprises receiving a broadcast message comprising the one or more phase noise statistical values.

24. The method of claim 22, further comprising transmitting, to the base station, a request for the one or more phase noise statistical values, wherein receiving the one or more phase noise statistical values is in accordance with transmitting the request, and wherein receiving the one or more phase noise statistical values comprises receiving a radio resource control message.

25. The method of claim 22, wherein receiving the indication of the one or more updated phase noise statistical values comprises receiving a set of updated phase noise statistical values associated with a respective set of offsets from a center frequency of the single carrier on frequency resources associated with one offset of the set of offsets.

26. The method of claim 22, wherein receiving the indication of the one or more updated phase noise statistical values comprises:

receiving a first updated phase noise statistical value associated with a first offset from a center frequency of the single carrier on frequency resources associated with the first offset; and receiving a second updated phase noise statistical value associated with a second offset from the center frequency of the single carrier on frequency resources associated with the second offset.

* * * * *